United States Patent
Chen et al.

(10) Patent No.: US 9,066,291 B1
(45) Date of Patent: Jun. 23, 2015

(54) ACTIVE NETWORK SYSTEM FOR WIRELESS COMPUTER NETWORKS

(75) Inventors: James Chen, Santa Clara, CA (US);
Lawrence Tse, Fremont, CA (US);
Brian Bosso, Scotts Valley, CA (US);
Hunghsin Kuo, San Jose, CA (US);
Chuong Vu, San Jose, CA (US)

(73) Assignee: Marvell International LTD., Hamilton (BM)

( * ) Notice: Subject to any disclaimer, the term of this patent is extended or adjusted under 35 U.S.C. 154(b) by 1402 days.

(21) Appl. No.: 10/826,171

(22) Filed: Apr. 16, 2004

(51) Int. Cl.
*H04B 7/14* (2006.01)
*H04W 52/02* (2009.01)

(52) U.S. Cl.
CPC ...... *H04W 52/0212* (2013.01); *H04W 52/0261* (2013.01)

(58) Field of Classification Search
USPC .................................. 370/315; 395/500, 856
See application file for complete search history.

(56) References Cited

U.S. PATENT DOCUMENTS

| | | | | |
|---|---|---|---|---|
| 4,823,256 | A * | 4/1989 | Bishop et al. | 714/10 |
| 5,278,973 | A * | 1/1994 | O'Brien et al. | 717/168 |
| 5,815,732 | A * | 9/1998 | Cooper et al. | 710/36 |
| 6,092,207 | A * | 7/2000 | Kolinski et al. | 713/323 |
| 6,772,241 | B1 * | 8/2004 | George et al. | 710/36 |
| 2003/0026424 | A1 * | 2/2003 | McGarrahan et al. | 380/255 |
| 2004/0059837 | A1 * | 3/2004 | Volpano | 709/249 |
| 2004/0121648 | A1 * | 6/2004 | Voros | 439/535 |

OTHER PUBLICATIONS

IEEE Standard 802.11b-1999/Cor 1-2001, IEEE Standard for Information technology—Telecommunications and information exchange between systems—Local and metropolitan area networks—Specific requirements, Part 11: Wireless LAN Medium Access Control (MAC) and Physical Layer (PHY) specifications; Amendment 2: Higher-speed Physical Layer (PHY) extenstion in the 2.4 GHz band—Corrigendum 1, IEEE Computer Society, Nov. 7, 2001, pp. 1-15.
IEEE Standard 802.16, IEEE Standard for Local and metropolitan area networks, Part 16: Air Interface for Fixed Broadband Wireless Access Systems, IEEE Computer Society and the IEEE Microwave Theory and Techniques Society, Apr. 8, 2002, pp. 1-322.
IEEE Standard 802.16a, IEEE Standard for Local and metopolitan area networks, Part 16: Air Interface for Fixed Broadband Wireless Access Systems—Amendment 2: Medium Access Control Modifications and Additional Physical Layer Specifications for 2-11 GHz, IEEE Computer Society and the IEEE Microwave Theory and Techniques Society, Apr. 1, 2003, pp. 1-292.

(Continued)

*Primary Examiner* — Charles Shedrick

(57) ABSTRACT

An active network system for a host device with a host processor, comprises a wireless port including a first physical layer/medium access control (PHY/MAC) device. A first wired port includes a second PHY/MAC device. A secondary processor communicates with the wireless port, the first wired port and the host processor. The secondary processor, the wireless port and the first wired port support network functionality when the host processor is an inactive mode. The network functionality includes at least one of access point functionality, router functionality, repeater functionality, point-to-point functionality and point-to-multipoint functionality.

131 Claims, 15 Drawing Sheets

(56) References Cited

OTHER PUBLICATIONS

IEEE Standard P802.11g/D8.2, Draft Supplemental to Standard [for] Information Technology, Telecommunications and information exchange between systems—Local and metropolitan area networks—Specific requirements, Part 11: Wireless LAN Medium Access Control (MAC) and Physical Layer (PHY) specifications; Further Higher Data Rate Extension in the 2.4 GHz band, Apr. 2003, pp. 1-69.

IEEE Standard 802.11, 1999 Edition, Information Technology—Telecommunications and information exchange between systems—Local and metropolitan area networks—Specific requirements, Part 11: Wireless LAN Medium Access Control (MAC) and Physical Layer (PHY) Specifications, pp. 1-512.

IEEE Standard 802.11a-1999, Supplemental to IEEE Standard for Information Technology—Telecommunications and information exchange between systems—Local and metropolitan area networks—Specific requirements, Part 11: Wireless LAN Medium Access Control (MAC) and Physical Layer (PHY) specifications: High-Speed Physical Layer in the 5 GHz band, Adopted by the ISO/IEC and redesignated as ISO/IEC 8802-11:1999 Amd 1:2000(E), pp. 1-83.

IEEE Standard 802.11b-1999, Supplemental to IEEE Standard for Information Technology—Telecommunications and information exchange between systems—Local and metropolitan area networks—Specific requirements, Part 11: Wireless LAN Medium Access Control (MAC) and Physical Layer (PHY) specifications: Higher-Speed Layer Extension in the 2.4 GHz band, Sep. 16, 1999, pp. 1-89.

* cited by examiner

FIG. 7A

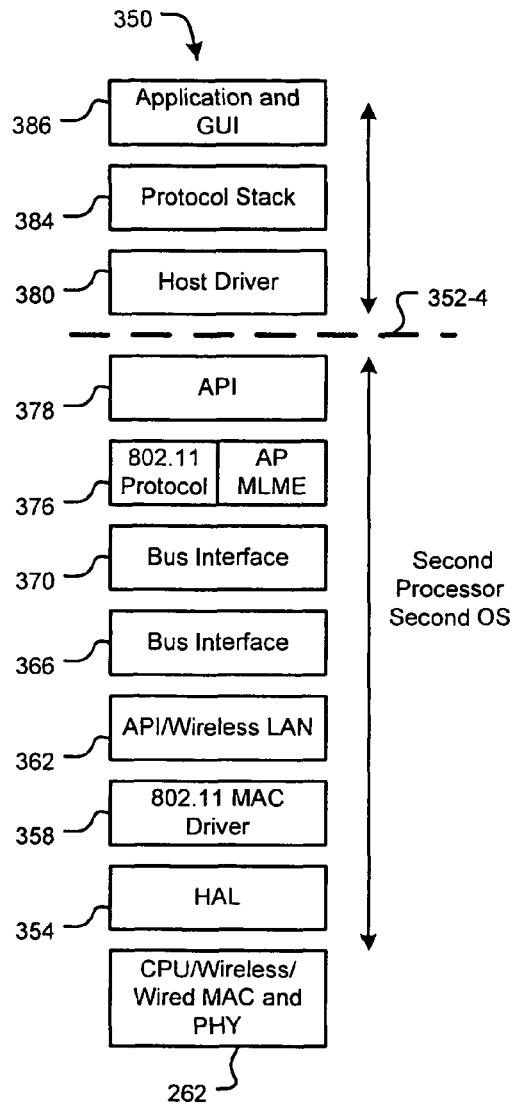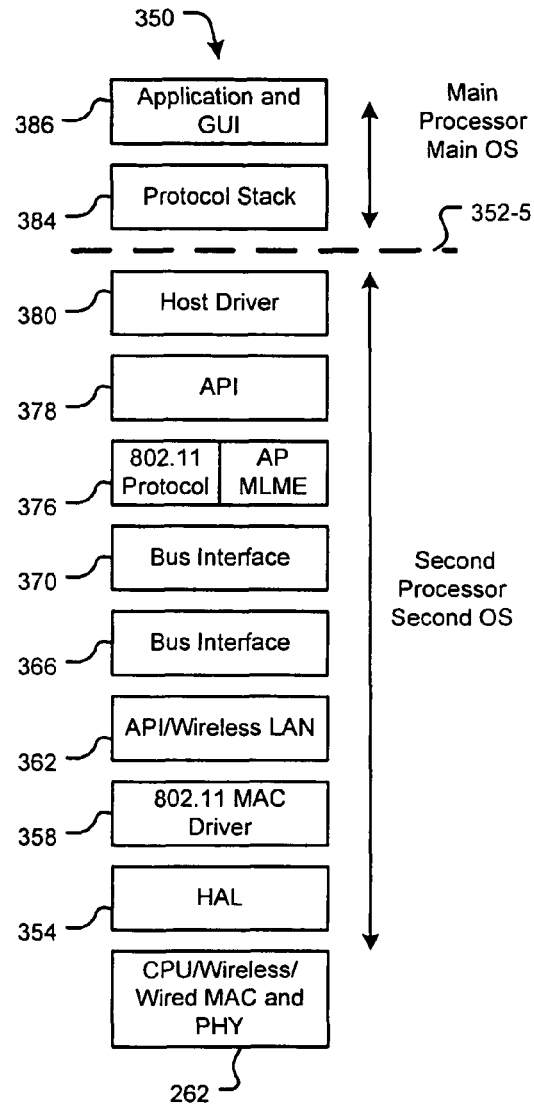
FIG. 12  FIG. 13

ACTIVE NETWORK SYSTEM FOR WIRELESS COMPUTER NETWORKS

FIELD OF THE INVENTION

The present invention relates to wireless networks, and more particularly to an active network system that implements wireless network functions such as access points, routers, repeaters, point-to-point, point-to-multipoint and the like using personal computers.

BACKGROUND OF THE INVENTION

Referring now to FIG. 1, cable and satellite system operators charge monthly fees for delivering basic channels, premium channels and/or pay-per-view content. The cable and satellite system operators usually install a set top box 20 that has an input that is connected to cable 24 and an output that is connected to a television (TV) 28. The cable 24 may, in turn, be connected to a satellite antenna for satellite-based service or to a cable provider for cable-based service. The set top box 20 receives, de-encrypts, and/or decodes digital signals from the provider and generates analog and/or digital video signals for the TV 28. The set top box 20 may also support additional functionality such as electronic program guides (EPG), gaming and/or other services.

A smart video recording device 32 allows users to record and/or to time-shift programs. Typically the smart video recording device 32 includes a digital video recorder (DVR) that records digital content on a hard disk drive. The smart video recording device 32 may also predict and record content that the user would probably like based on the user's prior selections, a user-created profile and/or other criteria. When the smart video recording device 32 is used, it is typically connected between the set top box 20 and the TV 28. One problem that is associated with the video distribution system that is shown in FIG. 1 relates to the playback of the recorded programs in other locations or rooms at the home of the subscriber. It is difficult to watch recorded programs in another location without moving the smart video recording device 32 to the new location. Running connection wires to the new location is usually undesirable.

Cable and phone companies also provide high-speed connections to the Internet. A modem 40 is usually connected by cable or a phone line (both identified by reference number 42) to an Internet provider. The modem 40 is usually a cable or digital subscriber line (DSL or xDSL) modem. A host device 44 is directly connected to the modem 40 if a single point of access to the Internet is desired. If the user would like to access the Internet in other locations, the user may purchase a router and connect it to the modem 40. Then, the user may install and connect cable to other desired locations. When a home or business is being constructed, laying cable to these other locations is relatively easy. When the home or business is already constructed and not wired, it may be difficult and/or expensive to wire the home or business for wired networking (without having exposed wires).

Wireless networks, such as those compliant with IEEE §§802.11a, 802.11b, 802.11g, 802.11n, and 802.16 (which are hereby incorporated by reference) and future wireless network standards, are often used by homes and businesses to provide wireless access to the Internet. The wireless networks can be used to share the Internet connection with multiple host devices. In addition, wireless networks may be implemented in homes or businesses without the need to lay cable in each location where users may desire access.

Referring now to FIG. 2, the wireless network system includes the modem 40 and a router 50, which is connected to the modem 40. A wireless access point 54 is wired to the router 50, for example using CAT5 cable. In this example, laptop computers 56 and 58 have a wireless network interface that communicates wirelessly with the access point 54. The access point 54 communicates over wires with the router 50, modem 40 and the Internet. While the host device 44 is shown to include a wired connection to the router 50, the host device 44 may be wirelessly connected and/or the laptops 56 and/or 58 may be wired. Repeaters 60-1 and 60-2 (collectively repeaters 60) may be used to further extend the wireless network. In some situations, the repeaters 60 may be access points that are operated in a repeater mode. The repeaters 60 retransmit received messages without alteration. Alternately, a combined router/wireless access point (not shown) can be directly connected to the modem 40. In the network in FIG. 2, the router and access point are separate devices from the laptops and other computers in the network.

Referring now to FIG. 3, in other networks, the router, access point and/or other network functions are implemented in software (not shown) by a host computer 44'. Likewise the repeaters 60-1 and/or 60-2 may be integrated with the laptop computers 56 and 58 and/or other computers such as desktop computers.

By integrating the router, access points and/or other network functions with the host device, the number of devices that need to be purchased is reduced. Furthermore, the space that is normally occupied by these other devices can be used for other purposes. One disadvantage in using conventional software-based routers, access points and/or other network functions, however, relates to their unavailability when the host computer is off, in a hibernating mode and/or not operable (i.e., crashed). Therefore, if a particular user relies upon the software-based network function provided by the host computer, the network user must make sure that the particular host computer is turned on, remains active and is responsive.

SUMMARY OF THE INVENTION

An active network system according to the present invention for a host device with a host processor comprises a wireless port including a first physical layer/medium access control (PHY/MAC) device. A first wired port includes a second PHY/MAC device. A secondary processor communicates with the wireless port, the first wired port and the host processor. The secondary processor, the wireless port and the first wired port support network functionality when the host processor is an inactive mode.

In other features, the inactive mode includes at least one of an off state, a hibernating state and an on-but-non-responsive state. An active mode includes an on state when the host processor is responsive. The network functionality includes at least one of access point functionality, router functionality, repeater functionality, point-to-point functionality and point-to-multipoint functionality.

In other features, a switch selectively connects a first medium to the first wired port when the host processor is in the inactive mode. The secondary processor or the host processor controls the switch. Alternately, a host processor monitoring device monitors an active/inactive mode of the host processor and controls the switch based thereon.

A host device comprises the active network system and further comprises the host processor. A second wired port communicates with the host processor and includes a third PHY/MAC device. The switch selectively connects the first medium to the second wired port when the host processor is in the active mode. The switch selectively connects the first medium to the first wired port when the host processor is in the inactive mode.

In other features, the host processor executes a first set of layers of a software stack and the secondary processor executes a second set of layers of the software stack when the host processor is in the active mode. The secondary processor executes the first and second set of layers excluding host device-related layers when the host processor is in the inactive mode. The second wired port supports wired network functionality with a first medium when the host processor is in the active mode. The host device-related layers of the software stack include a bus interface layer, a wireless LAN layer, and a host driver layer.

In other features, memory communicates with the secondary processor. The secondary processor, the wireless port and the first wired port support web-based access to network settings, which are stored in the memory, when the host processor is in the inactive mode.

In other features, a host interface communicates with a host bus and the secondary processor. The host bus includes one of a peripheral component interconnect (PCI) bus, a universal serial bus (USB), an IEEE 1394 bus, PCI Express bus, a media independent interface (MII), a PCMCIA bus, and a mini PCI bus. The second PHY/MAC device supports at least one of 10BaseT, 100BaseT and 1000BaseT. The first PHY/MAC device supports a wireless network. The wireless network is compliant with at least one of IEEE section 802.11, 802.11a, 802.11b, 802.11g, 802.11n, and 802.16.

A wireless video distribution system comprises the active network system and further comprises a remote device and a set top box that communicates with the host device and that receives content from a content provider. The host processor and the wireless port wirelessly distribute the content to the remote device when the host processor is in the active mode. The secondary processor, the wireless port and the first wired port support the network functionality when the host processor is in the inactive mode. The host device provides standby current that is used to power the active network system during the inactive mode.

An active repeater system according to the present invention for a host device with a host processor includes a wireless port including a first physical layer/medium access control (PHY/MAC) device. A secondary processor selectively communicates with the wireless port and the host processor. The secondary processor and the wireless port support repeater functionality when the host processor is the inactive mode.

In other features, the inactive mode includes at least one of an off state, a hibernating state and an on-but-non-responsive state. The active mode includes an on state when the host processor is responsive. The host processor executes a first set of layers of a software stack and the secondary processor executes a second set of layers of the software stack when the host processor is in the active mode. The secondary processor executes the first and second set of layers of the software stack excluding host device-related layers when the host processor is in the inactive mode. The host device-related layers of the software stack include bus interface layers, wireless LAN layers, and host driver layers.

In other features, the secondary processor and the wireless port support web-based access to repeater network settings when the host processor is in the inactive mode. A host interface communicates with a host bus and the secondary processor. The host bus includes one of a peripheral component interconnect (PCI) bus, a universal serial bus (USB), an IEEE 1394 bus, PCI Express bus, a PCMCIA bus, a media independent interface (MII), a serial ATA interface, a memory stick interface, a secure digital input/output (SDIO) interface, and a mini PCI bus. The first PHY/MAC device supports a wireless network. The wireless network is compliant with at least one of IEEE section 802.11, 802.11a, 802.11b, 802.11g, 802.11n, and 802.16. The host device provides standby current that is used to power the active repeater system during the inactive mode.

An active network system according to the present invention that supports network functionality comprises a host device including a host processor that executes a first set of layers of a network function software stack when the host processor is in an active mode. A secondary processor communicates with the host processor and executes a second set of layers of the network function software stack when the host processor in the active mode. The secondary processor executes the first and second sets of layers of the network function software stack excluding host device-related layers when the host processor is in the inactive mode.

In other features, the inactive mode includes at least one of an off state, a hibernating state and an on-but-non-responsive state. An active mode includes an on state when the host processor is responsive. The network functionality includes at least one of access point functionality, router functionality, repeater functionality, point-to-point functionality, and point-to-multipoint functionality.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7A is a more detailed functional block diagram of one implementation of an active network system;

FIGS. 10-14 illustrate other exemplary divisions of the network function software stack between the host processor and secondary processor when the host processor is in the active mode.

DETAILED DESCRIPTION OF THE PREFERRED EMBODIMENTS

Figure 1:
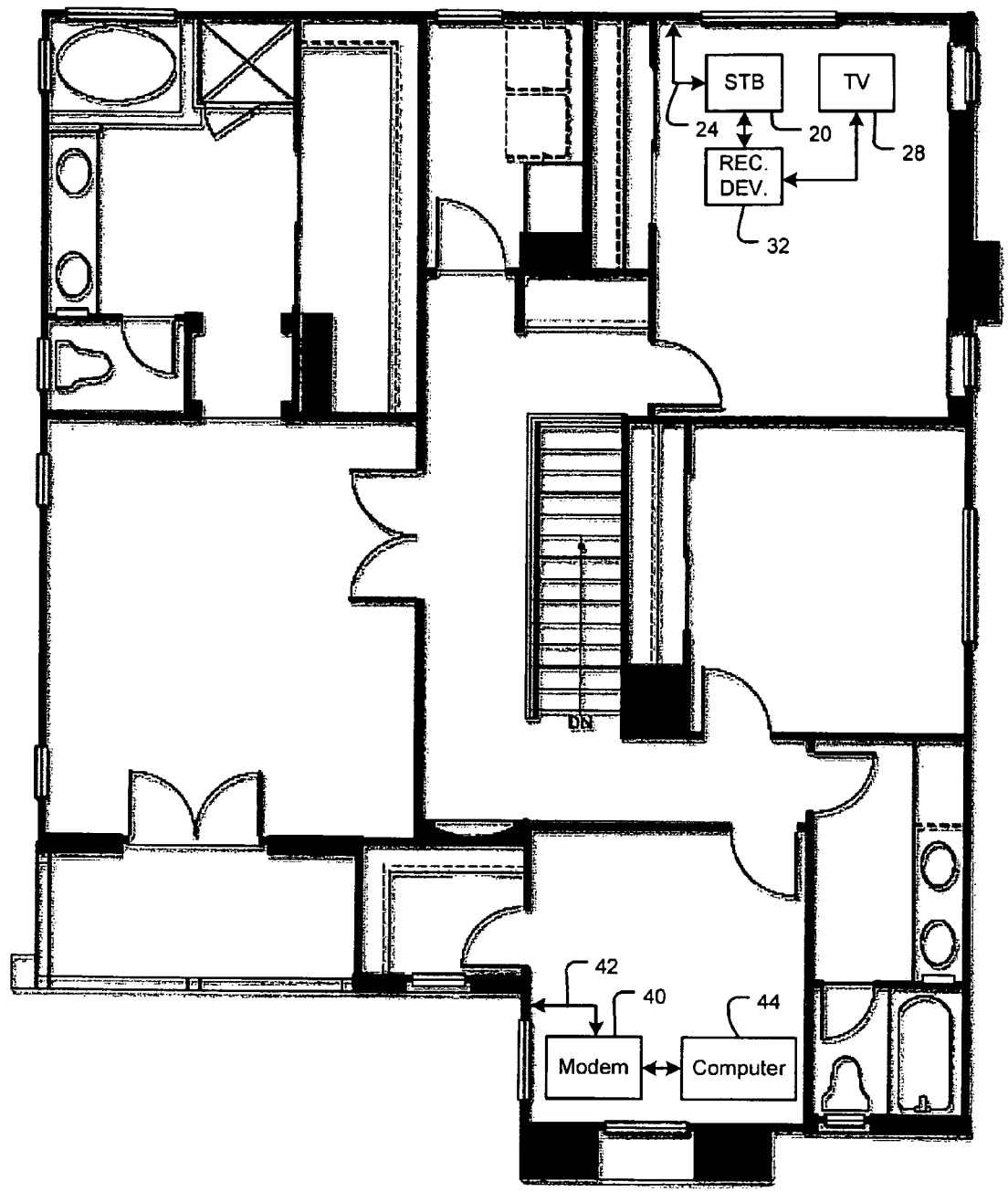
FIG. 1 is a functional block diagram of a cable TV system with a set top box and a computer with a high speed Internet connection.
Figure 2:
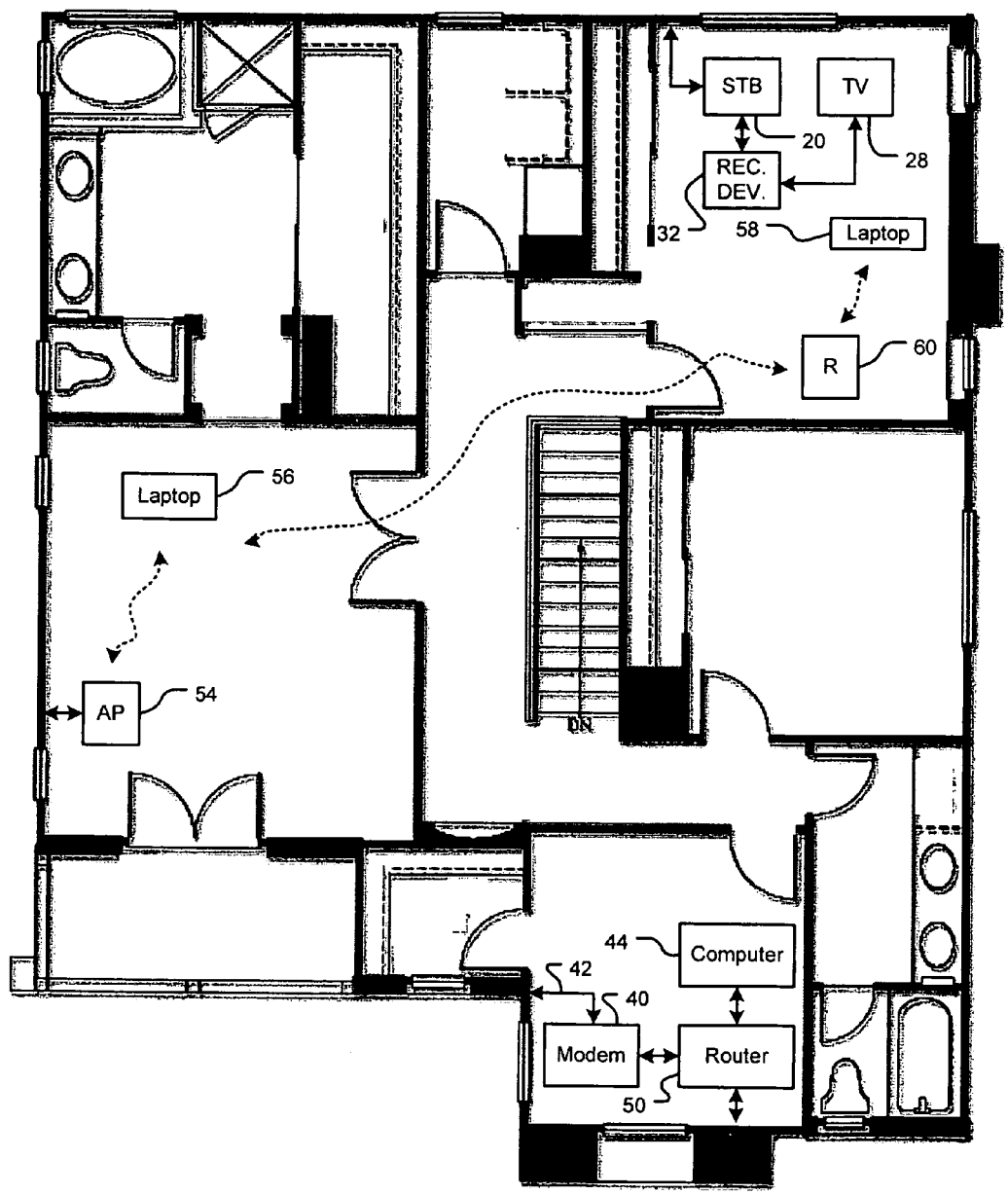
FIG. 2 is a functional block diagram of a cable TV system with a set top box and a computer with a wireless network and a high speed Internet connection.
Figure 3:
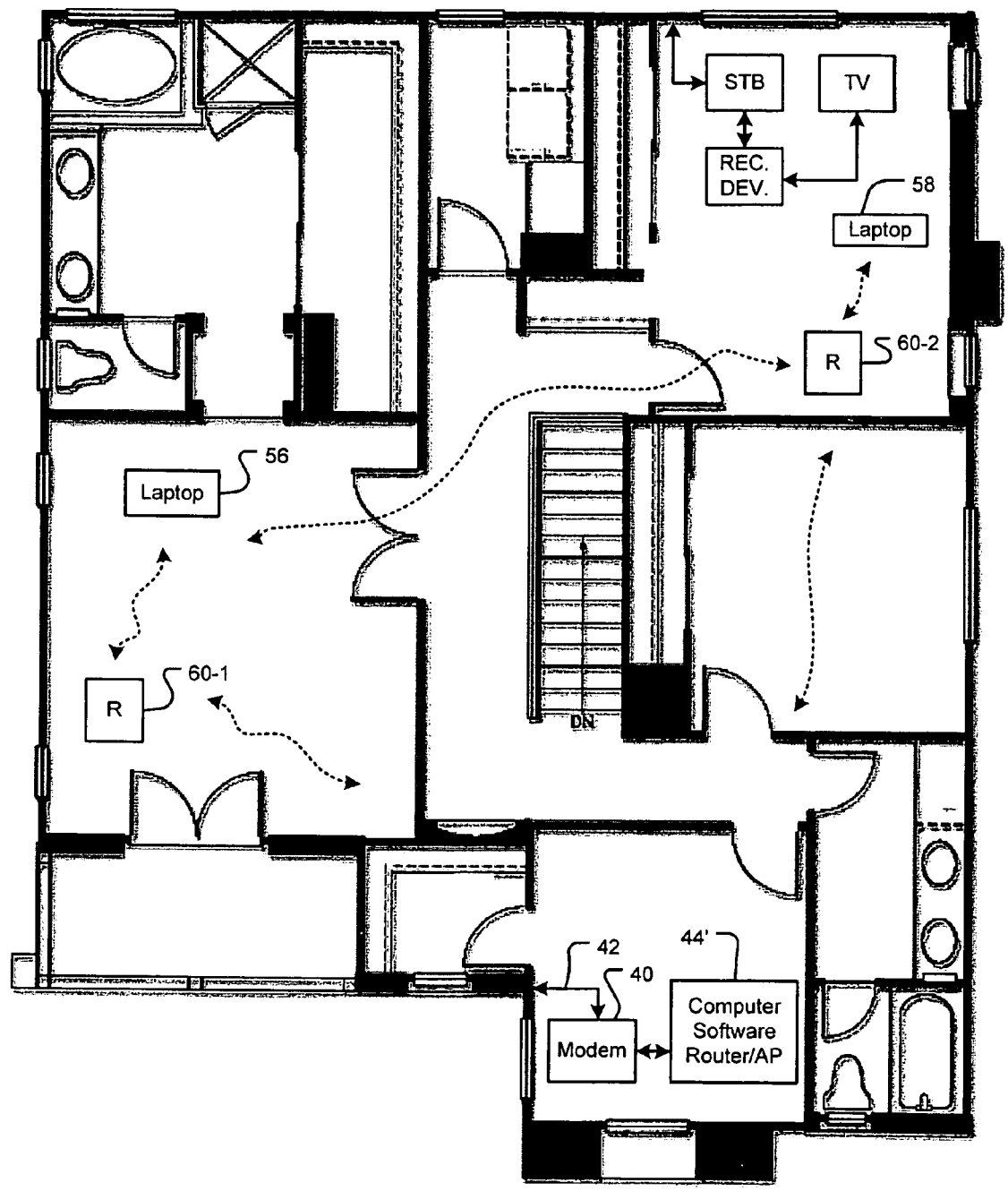
FIG. 3 is a functional block diagram of a cable TV system with a set top box and a host computer with a software-implemented access point and router and a high speed Internet connection.

The following description of the preferred embodiment(s) is merely exemplary in nature and is in no way intended to limit the invention, its application, or uses. For purposes of clarity, the same reference numbers will be used in the drawings to identify similar elements.

As used herein, the term "active mode" refers to active operation of the host processor and/or the primary graphics processor of the host device. The term active mode does not include situations where the host processor is on but not responsive (e.g., hibernating and/or crashed). The term "inactive mode" refers to low-power hibernating modes, off modes, and/or non-responsive modes such as when the host device crashes or hangs. The term "host device" refers to any system that includes a processor, memory and an input/output interface. Exemplary host devices include but are not limited to desktop computers, laptops, smart video recorders, and set top boxes, although still other types of host devices are contemplated.

A host device with an active access point, router and/or repeater system (generically active network systems) according to the present invention supports network functionality when the host processor is in the active mode and when the host processor is in the inactive mode. In addition to access point, router, and/or repeater functionality, the active network system can also support other network functions such as point-to-point and point-to-multipoint. The active network system has the ability to detect the active/inactive mode of the host processor and to select an appropriate software stack.

An external Ethernet connection that is used when the host processor is in the active mode is also used when the host processor is in the inactive mode. In other words, the user does not need to unplug/replug the Ethernet cable when the host processor transitions between the active and inactive modes. As can be appreciated, the active network system is an improvement over current software-based approaches that require the host processor to be in the active mode to support a particular software-based network function.

Figure 4:
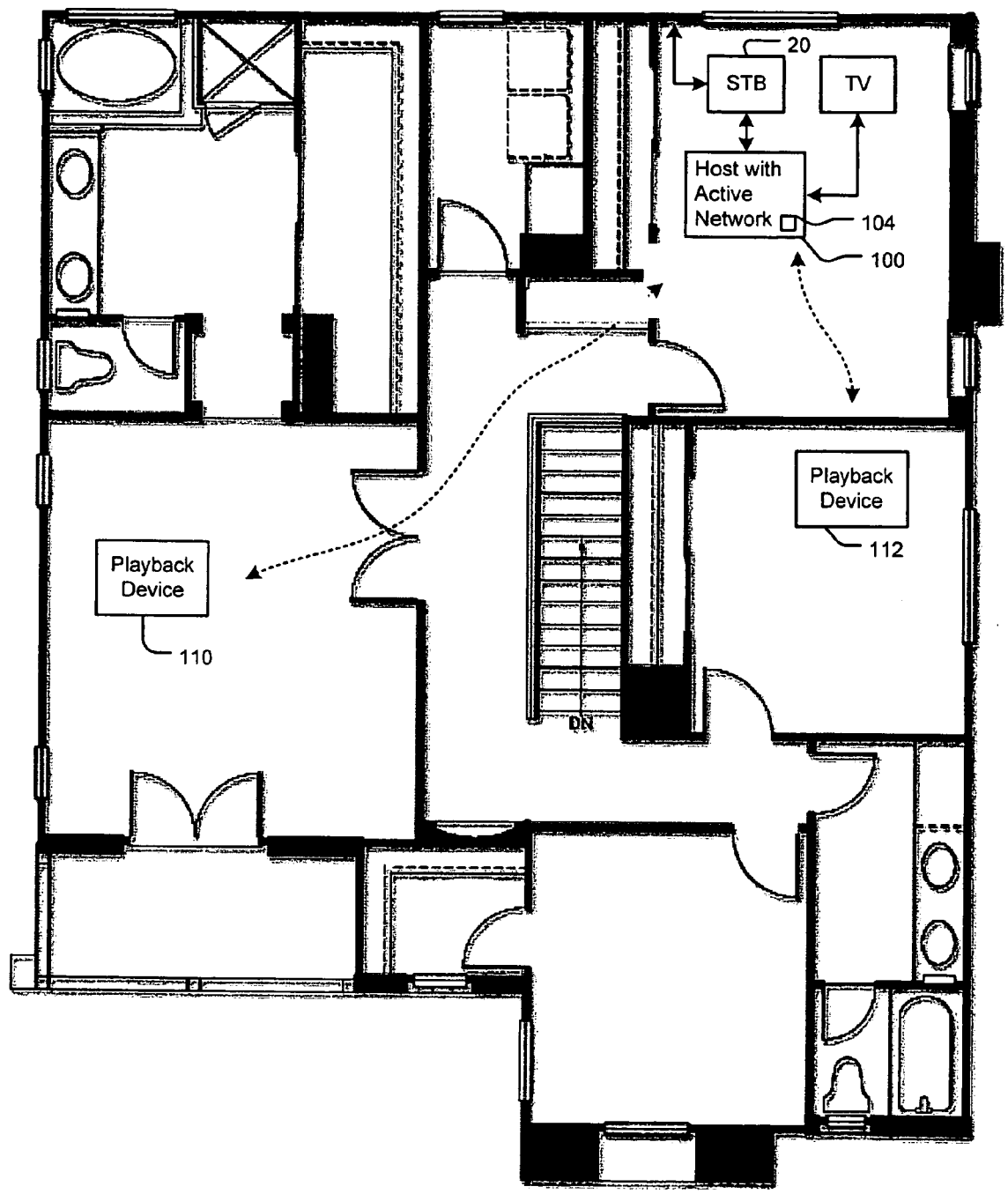
FIG. 4 is a functional block diagram of a host device according to the present invention that stores video, that includes an active access point and/or a router system, and that wirelessly distributes stored video content to one or more playback devices.

Referring now to FIG. 4, one application for a host device 100 with an active network system according to the present is shown. The host device 100 incorporates the functionality of the smart video recording device 32 and provides improved functionality. In particular, the host device 100 communicates with the set top box 20 and records content on a hard disk drive 104. The host device 100 can select and record programs based on past user selections, a user profile and/or on other criteria.

The host device 100 wirelessly distributes the stored content and/or currently playing programs to other video and/or audio playback devices 110 and/or 112 when in the active mode. The video and/or audio playback devices 110 and 112 can be TVs with wireless network interfaces, laptop computers, desktop computers and/or other devices. An audio-only mode can also be supported by audio devices with wireless interfaces to allow streaming audio to be wirelessly distributed. When in the inactive mode, the host device supports the selected network functions via the active network system, as will be described further below.

Figure 5:
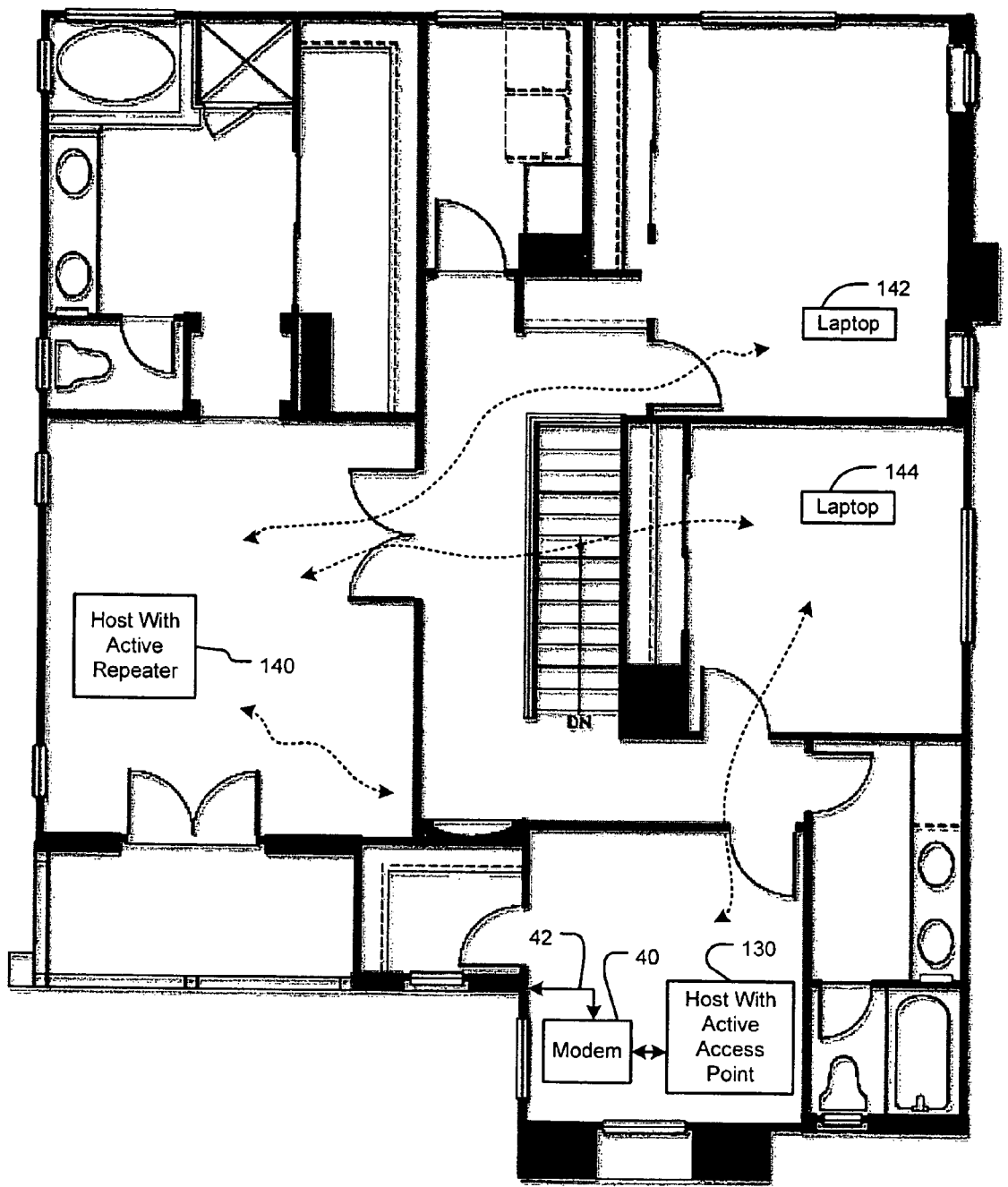
FIG. 5 is a functional block diagram of a wireless network according to the present invention including a host device with an active access point system and a second host device with an active repeater.

Referring now to FIG. 5, a host device 130 with an active network system is shown connected to a modem 40. The active network system of the host device 130 supports active access point functionality. The active network system may also support active router functionality as well as other network functions described above and below. The host device 130 wirelessly communicates with other computers and/or devices. For example, a second host device 140 includes an active network system, which supports active repeater functionality. The host devices 130 and 140 provide wireless connectivity to the Internet to other devices such as laptop computers 142 and 144 that are within range.

Figure 6:
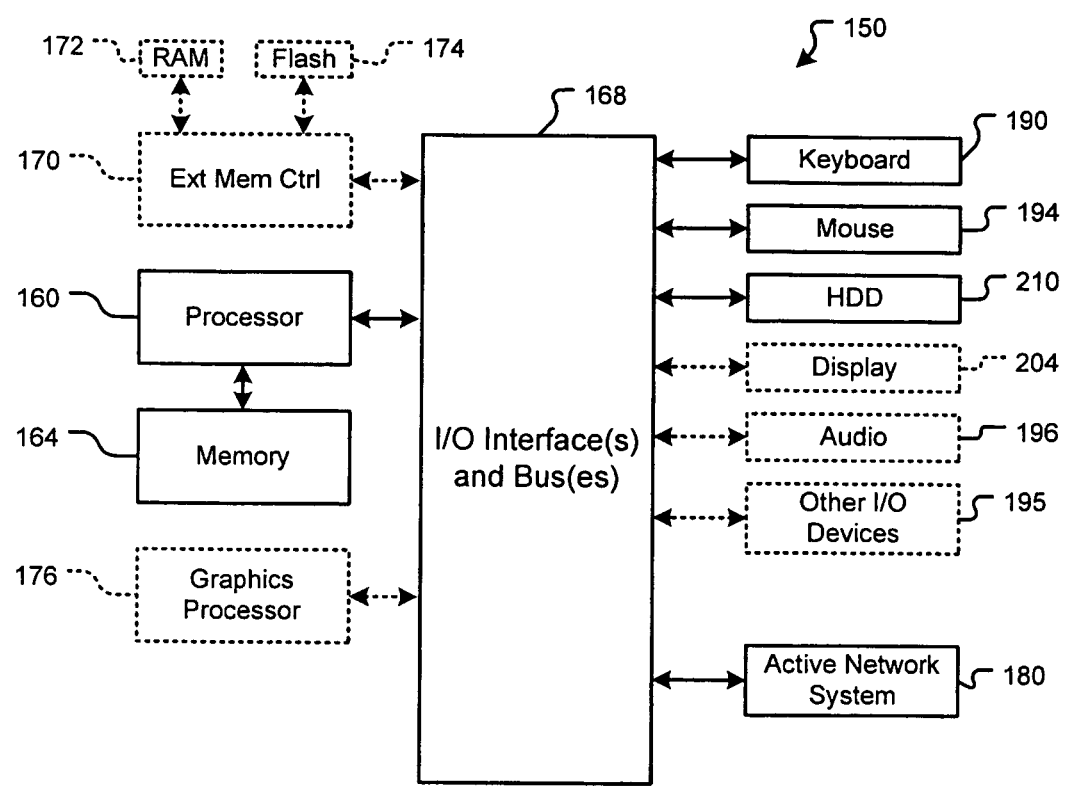
FIG. 6 is a functional block diagram of a host device architecture including an active network system.

Referring now to FIG. 6, an exemplary host device architecture that supports the active network system is shown. A host device 150 includes a host processor 160 and memory 164 that communicate with I/O interface 168. The I/O interface 168 includes one or more I/O interface and/or one or more bus that support input/output of data and communication of the data between components of the host device 150. For example, the I/O interface 168 may include a peripheral component interconnect (PCI) bus, a universal serial bus (USB), an IEEE 1394 bus, PCI Express bus, a PCMCIA bus, a mini PCI bus, a serial ATA interface, a memory stick interface, a secure digital input/output (SDIO) interface, a media independent interface (MII) and/or other buses that comply with current or future standards.

An optional external memory controller 170 communicates with the I/O interface 168 and external memory 172 such as DRAM and/or flash memory 174. An optional graphics processor 176 that communicates with the I/O interface 168 may be provided to improve graphics processing speed and/or capability. An active network system 180 according to the present invention communicates with the I/O interface 168.

A keyboard 190, mouse 194 and/or other user input/output (I/O) devices 195 communicate with the I/O interface(s) and bus(es) 168 and allow the user to interface with the host device 150. An optional audio device 196 communicates with the I/O interface 168 and supports audio output. An optional display 204 communicates with the I/O interface 168 and provides visual output. As can be appreciated, in some embodiments, the host device 150 may communicate with a display device such as a TV, which may be used as the display.

The host device 150 may have a Northbridge/Southbridge architecture, a hub architecture and/or other current and/or future architectures. The host device 150 executes an operating system (OS). For example, the processor 160 can be an Intel® processor running Microsoft Windows XP® or Linux, a MAC processor running a MAC® OS, and/or any other suitable processor and OS.

Figure 7A:
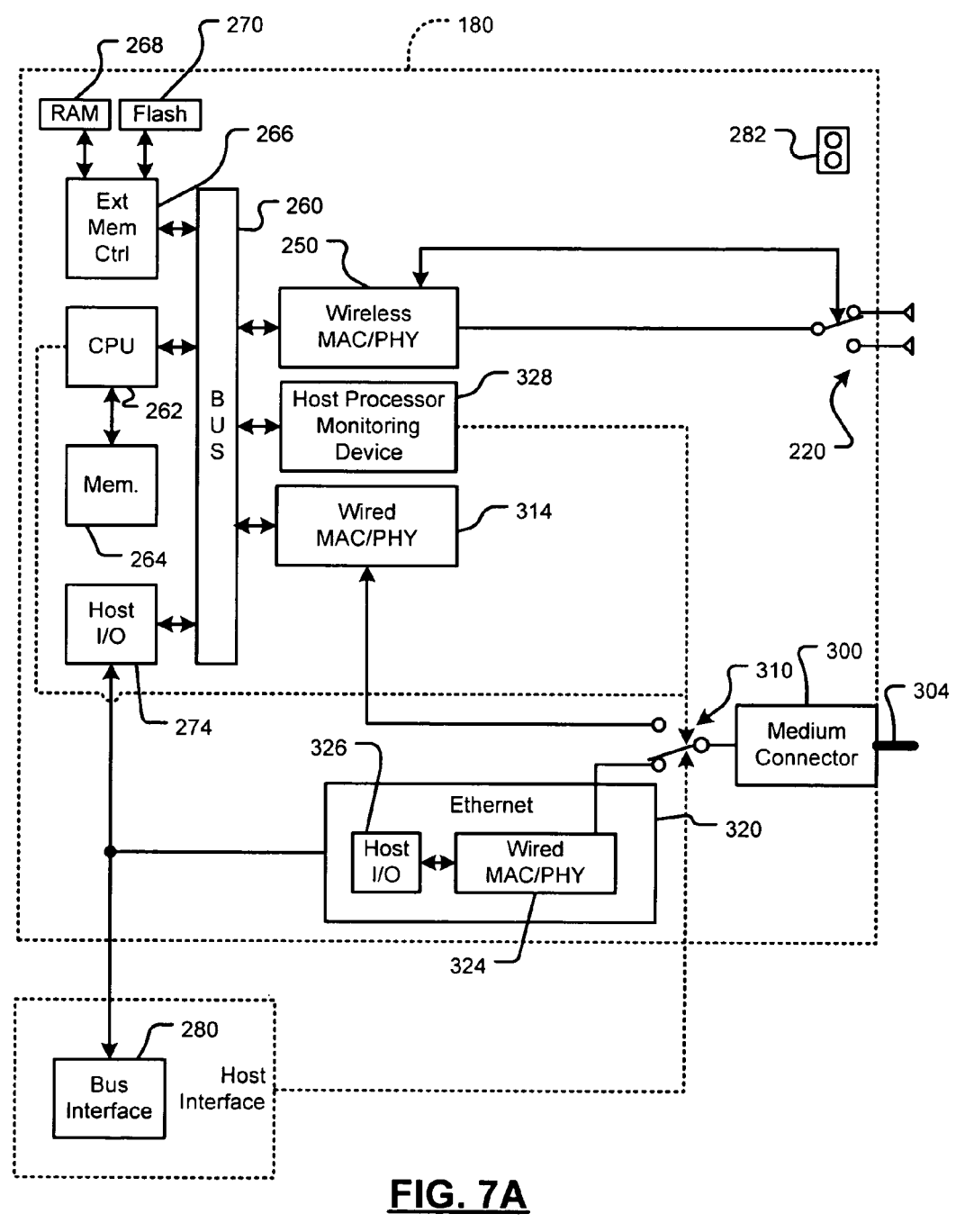

Referring now to FIG. 7A, one implementation of the active network system 180 is shown for applications where there is an existing wired port that is associated with the host device 150. The active network system 180 includes a wired port and a wireless port. A second wired port may be provided and/or the first wired port can be used when the host processor is both in the active and inactive modes. The active network system 180 includes an antenna 220 that communicates with the wireless port and transmits and receives wireless RF signals.

The antenna 220 communicates with a wireless MAC/PHY device 250, which, in turn, communicates with a system bus 260. The wireless MAC/PHY device 250 provides RF transmission and reception functionality, physical layer (PHY) functionality and media access control (MAC) layer functionality. The system bus 260 communicates with a secondary processor/wireless/wired MAC and PHY 262, which communicates with memory 264. The secondary processor/ wireless/wired MAC and PHY 262 runs an operating system (OS) such as eCOS or another suitable OS. The system bus 260 also communicates with external memory controller 266, which controls access to random access memory (RAM) 268 and flash memory 270. In one embodiment, the RAM 268 is SDRAM, although other types of memory can be used. A host input/output (I/O) interface 274 communicates with the system bus 260 and a bus interface 280 associated with the host device 150. The bus interface 280 provides an interface between the active network system 180 and the selected host bus.

The active network system 180 preferably receives power from the host device 150, for example via a connector 282 that is connected to the host device 150. For example, the host device 150 may be implemented on a motherboard, which typically maintains standby current. For example, some motherboards maintain standby current of approximately 1.25 A. This standby current is typically used to power memory, clocks, and other devices on the motherboards when the host device is in the inactive mode. Of the 1.25 A in this example, the motherboard typically uses less than 0.25 A. Therefore, more than 1.0 A of current is available for use by the active network system 180 in this example. While specific standby current levels are provided above, skilled artisans will appreciate that the present invention is not limited to these values and/or the method of powering the active network system when the host device is in the inactive mode.

The active network system 180 includes a medium connector 300 that provides a connection to an Ethernet connector and the Ethernet medium (which are both identified at 304). For example, the connector 300 may be an RJ-45 connector. The Ethernet medium is connected to a switch 310 that is controlled based upon the active/inactive mode of the host processor. When the host processor is in the inactive mode, the switch 310 connects the Ethernet medium to a wired PHY/MAC device 314, which is connected to the system bus 260. The wired PHY/MAC devices 312 and 314 support 10BaseT, 100BaseT, 1000BaseT and/or other current and future wired Ethernet standards and/or speeds when the host processor is in the inactive mode.

When the host processor is in the active mode, the switch 310 connects the Ethernet medium to an Ethernet device 320, which includes a wired PHY/MAC device 324 and a host I/O interface 326. The wired PHY/MAC device 324 support 10BaseT, 100BaseT, 1000BaseT and/or other current and future wired Ethernet standards and/or speeds when the host processor is in the active mode. In one embodiment, the active network system 180 includes 88W8000G and 88W8510 Chips from Marvell Semiconductor, Inc. As can be appreciated, however, some, none or all of the active network system 180 can be implemented on the motherboard (if used) of the host device 150.

The switch 310 may be controlled by the host processor, the secondary processor and/or by a host processor monitoring device 328. The host processor monitoring device 328 monitors the active/inactive mode of the host processor 160 and performs a watchdog function. If the host processor transitions to the inactive mode, crashes and/or goes into a hibernating state, the host processor monitoring device 328 changes the position of the switch 310. The watchdog function can be performed in a variety of ways. For example, the host processor monitor 328 can send messages to the host processor and wait for a response. If a response is not received and/or takes longer than a predetermined period, then the host processor may be considered in the inactive mode. Skilled artisans will appreciate that the host processor monitoring device 328 can sense the active/inactive mode in other ways. In an alternate embodiment, the host processor monitoring device 328 may switch processing between the host processor and the secondary processor when the host processor is busy performing other processing tasks.

Figure 7B:
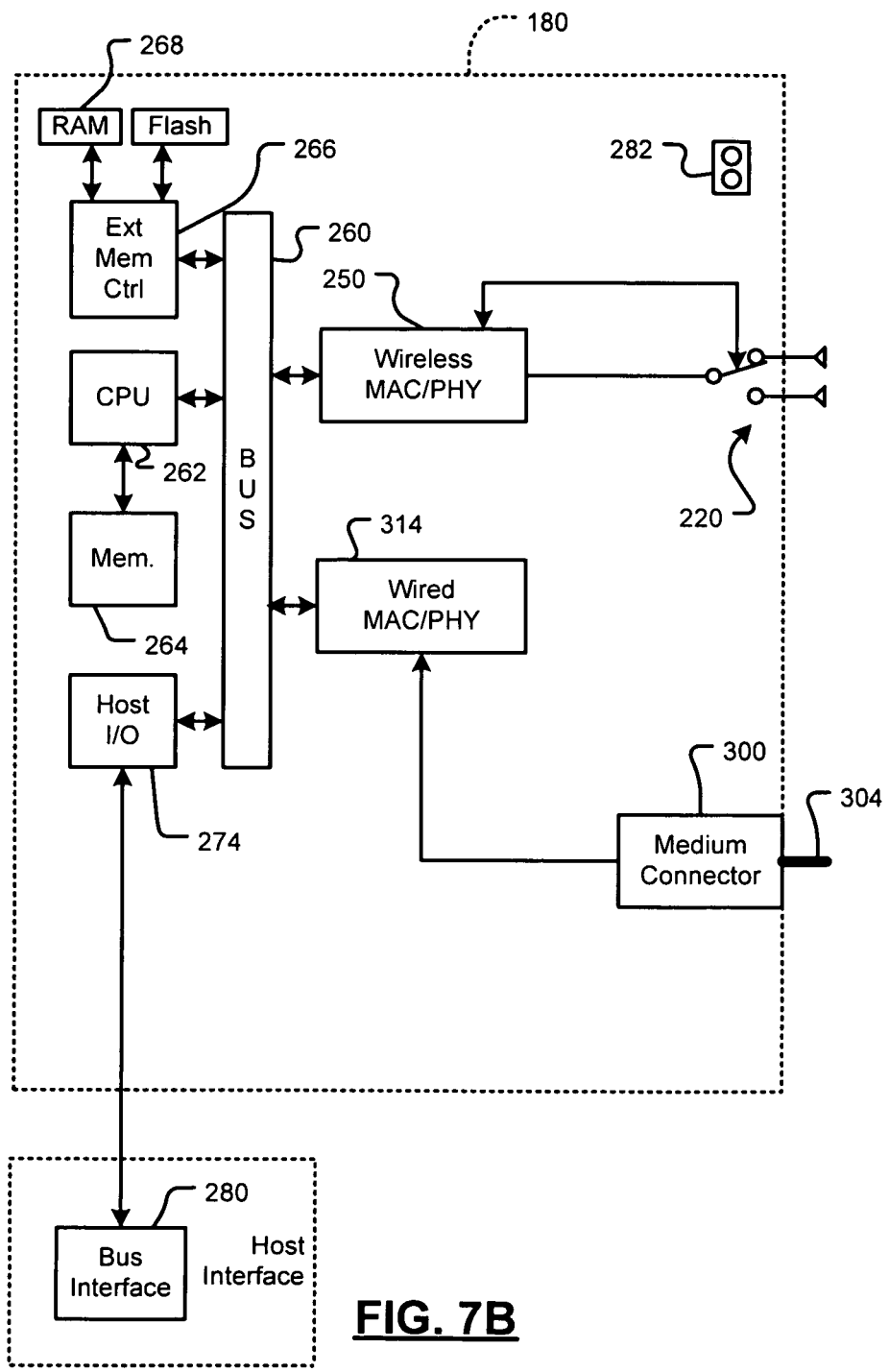
FIG. 7B is a more detailed functional block diagram of another implementation of an active network system.
Figure 7C:
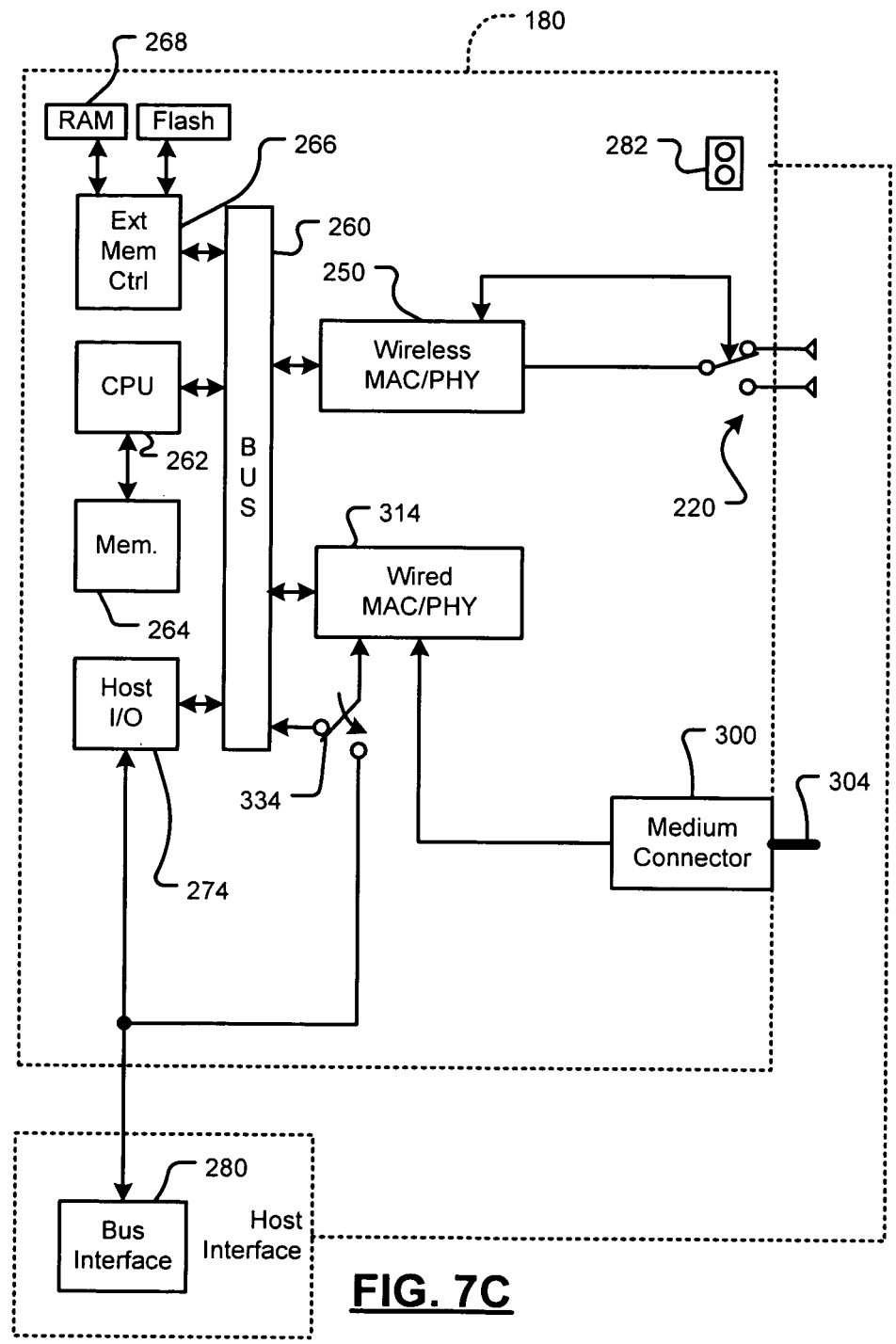
FIG. 7C is a more detailed functional block diagram of still another active network system.

Referring now to FIGS. 7B and 7C, other implementations of the active network system 180 are shown for applications where there is no existing wired port associated with the host device 150. The wired PHY/MAC device 314 may be used when the host device 150 is in the active mode and in the inactive mode to reduce cost. In an alternate configuration in FIG. 7C, a switch 334 may be used to bypass the system bus 260 and other devices when the host device 150 is in the active mode. While the host processor monitoring device 328 is omitted in FIGS. 7A and 7B, the device 328 can also be used in these implementations.

Figure 8A:
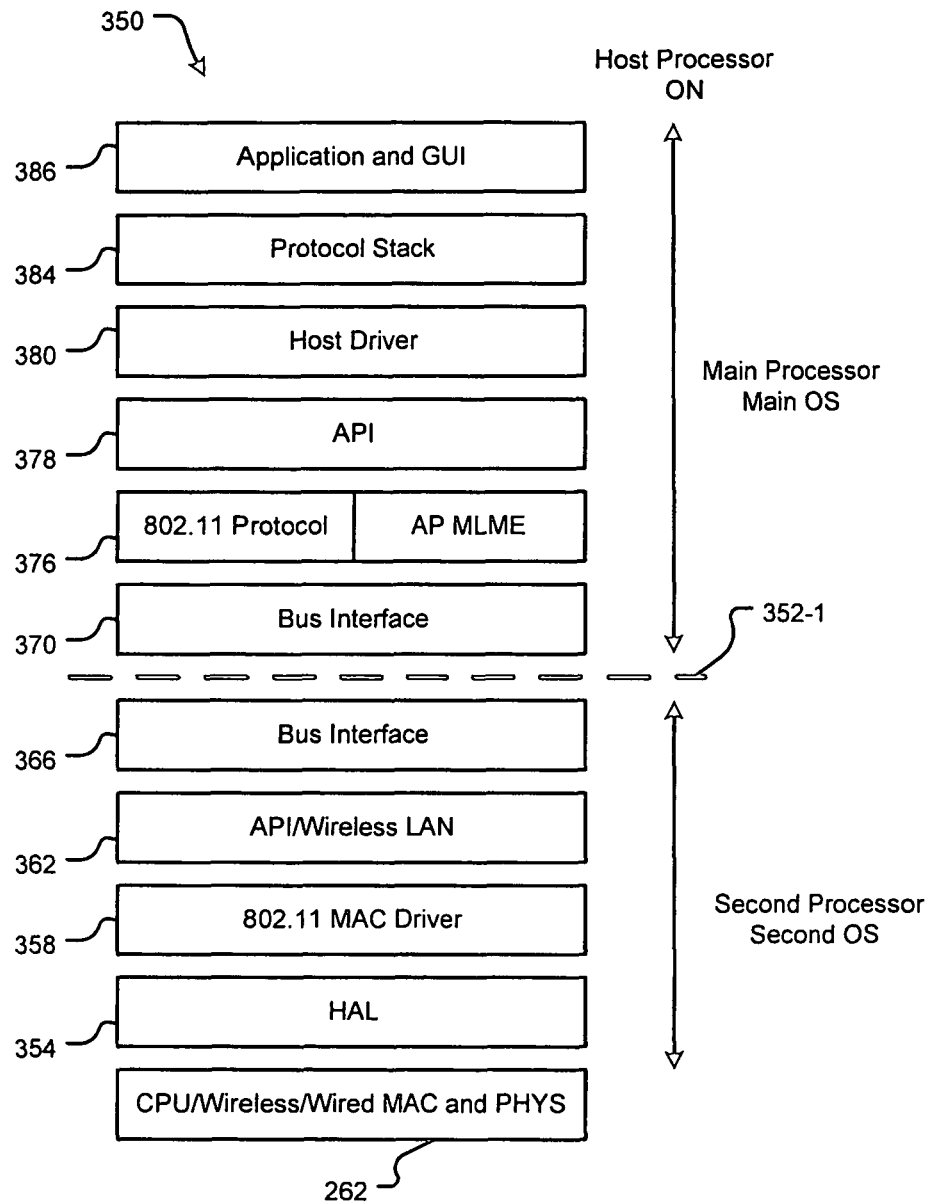
FIG. 8A illustrates a software stack when the host processor is in the active mode.
Figure 8B:
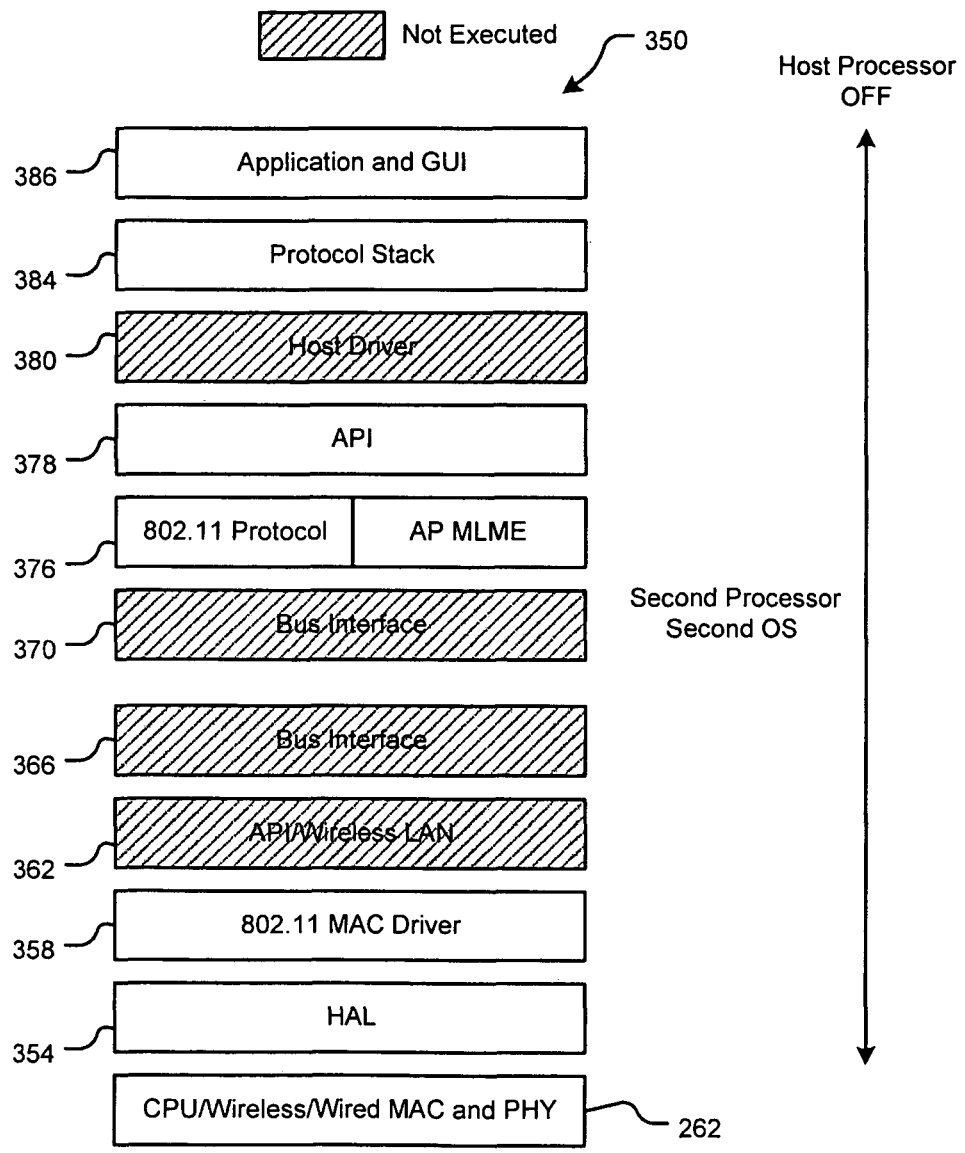
FIG. 8B illustrates the software stack executed by a secondary processor when the host processor is hibernating and/or off.

Referring now to FIGS. 8A and 8B, a software stack 350 is illustrated in further detail. When the host device 150 is in the active mode, the software stack 350 is divided between the host device 150 and the secondary processor/wireless/wired MAC and PHY 262 as shown by dotted line 352-1. The secondary processor/wireless/wired MAC and PHY 262 executes part of the software stack 350 including a hardware abstraction layer (HAL) 354 that provides a lower level interface to the secondary processor/wireless/wired MAC and PHY 262. A layer 2 or MAC driver layer 358 provides MAC drivers. A wireless LAN layer 362 supports wireless LAN functions. A bus interface 366 supports data transfer over the bus that is used to connect the active network system 180 to the host device 150.

The host device 150 executes another part of the software stack 350 including a bus interface 370, which supports data transfer over the bus. The software stack 350 further includes an 802.11 protocol and AP MAC layer management entity (MLME) layer 376, an application protocol interface (API) layer 378, a host driver layer 380 and a protocol stack layer 384. An application and graphical user interface (GUI) layer 386 supports a graphical user interface of the host OS. Referring now to FIG. 8B, when the host device 150 is in the inactive mode, the secondary processor/wireless/wired MAC and PHY 262 executes part of the software stack 350. Certain layers are not executed as shown. The wireless LAN layer 362, the bus interface layers 366 and 370 and the host driver layer 380 are not executed by the secondary processor/wireless/wired MAC and PHY 262 since they are not needed during the inactive mode.

Figure 9:
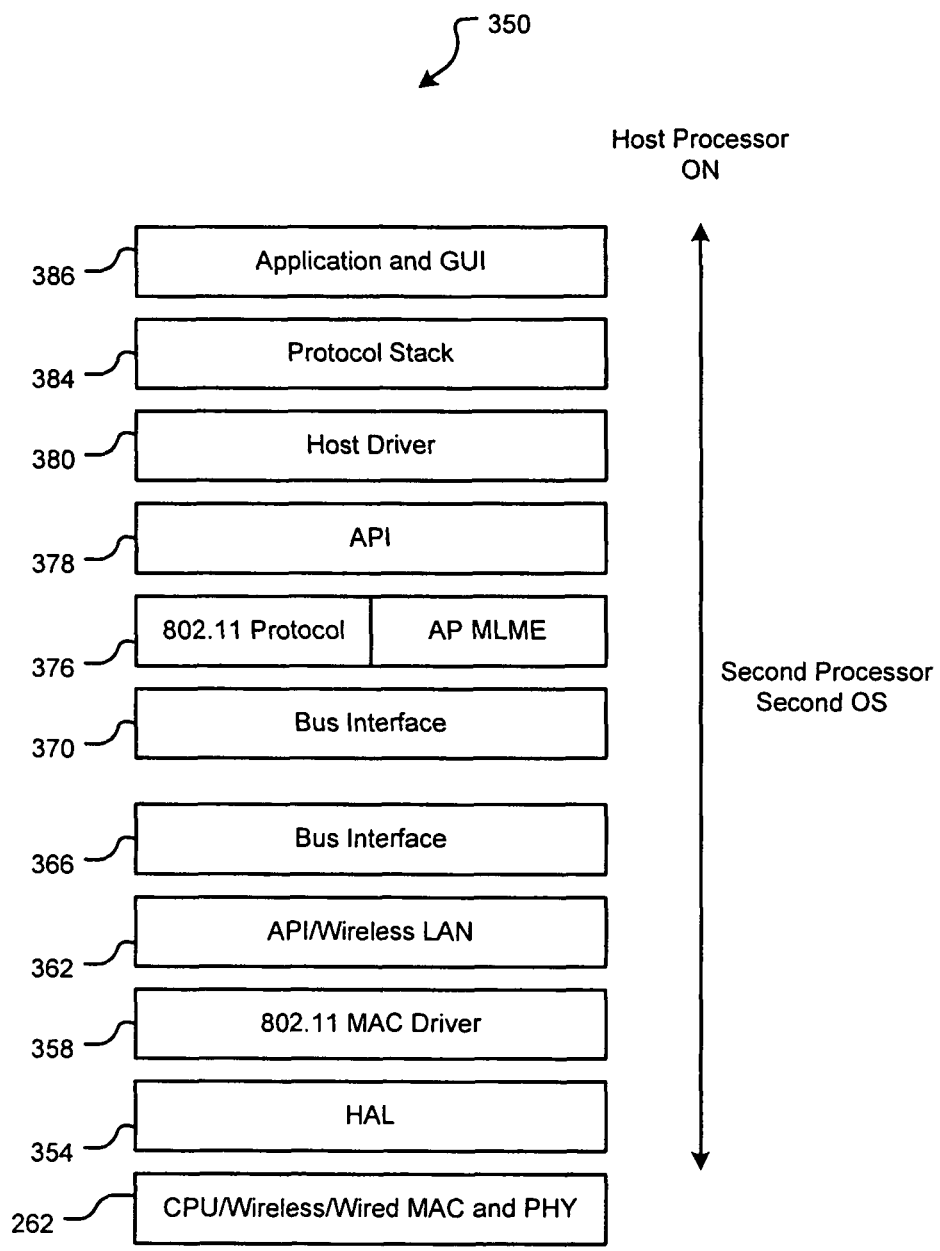
FIG. 9 illustrates an alternate software stack executed by a secondary processor when the host processor is in the active mode.

Referring now to FIGS. 9-14, in alternate implementations, the secondary processor/wireless/wired MAC and PHY 262 may take a more active role when the host device 150 is in the active mode, which will reduce the burden on the host processor 160. In FIG. 9, the secondary processor/wireless/wired MAC and PHY 262 executes the entire software stack 350 when the host processor 160 is in the active mode.

Figure 10:
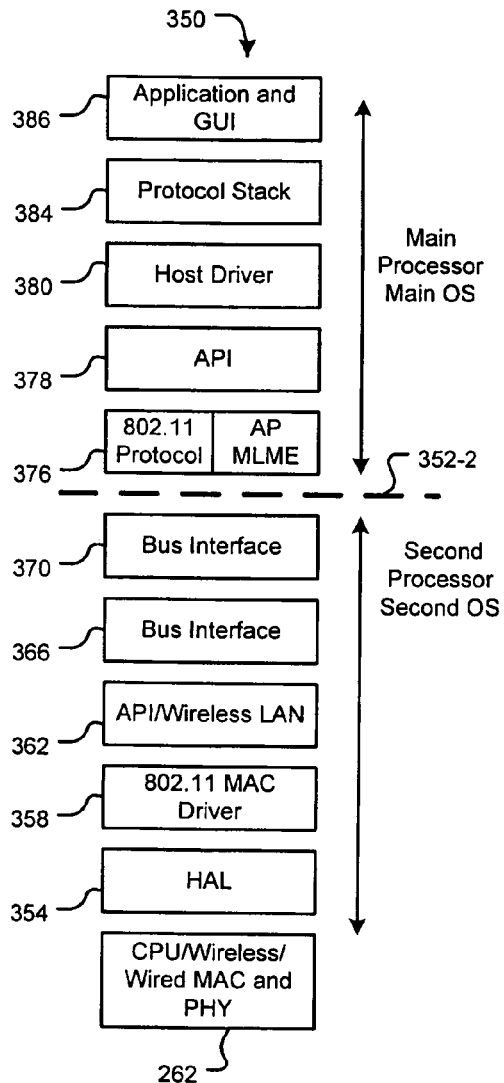
Figure 11:
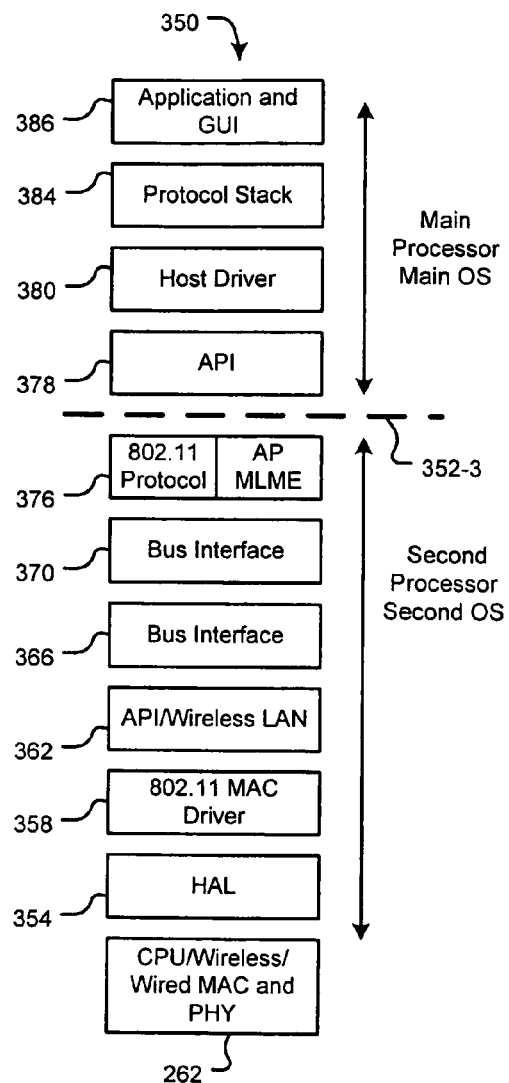

There are additional ways of dividing the software stack 350 between the host processor 160 and the secondary processor/wireless/wired MAC and PHY 262 as shown in FIGS. 10-14. In FIG. 10, when the host device 150 is in the active mode, the software stack is divided between the host device 150 and the secondary processor/wireless/wired MAC and PHY 262 as shown by dotted line 352-2. In this embodiment, the bus interface layer 370 is executed by the secondary processor in addition to the layers shown in FIG. 8A. In FIG. 11, when the host device 150 is in the active mode, the software stack is divided between the host device 150 and the secondary processor/wireless/wired MAC and PHY 262 as shown by dotted line 352-3. In this embodiment, the 802.11 protocol and AP MLME layer 376 is executed by the secondary processor/wireless/wired MAC and PHY 262 in addition to the layers shown in FIG. 10.

Figure 14:
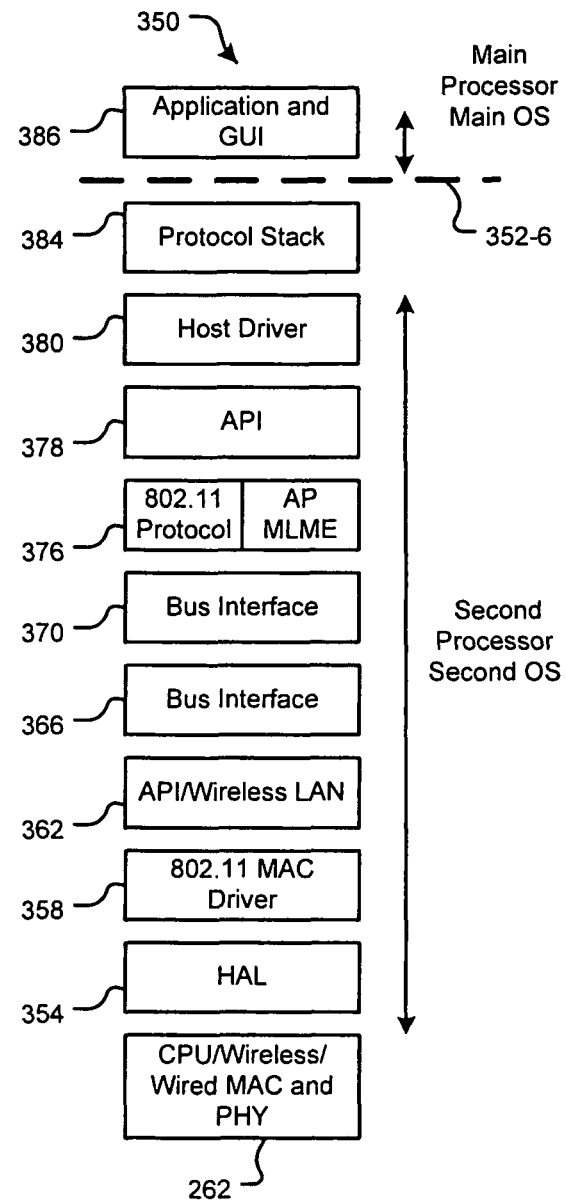

In FIG. 12, when the host device 150 is in the active mode, the software stack 350 is divided between the host device 150 and the secondary processor/wireless/wired MAC and PHY 262 as shown by dotted line 352-4. In this embodiment, the API layer 378 is executed by the secondary processor/wireless/wired MAC and PHY 262 in addition to the layers shown in FIG. 11. In FIG. 13, when the host device 150 is in the active mode, the software stack 350 is divided between the host device 150 and the secondary processor/wireless/wired MAC and PHY 262 as shown by dotted line 352-5. In this embodiment, the host driver layer 380 is executed by the secondary processor/wireless/wired MAC and PHY 262 in addition to the layers shown in FIG. 12. In FIG. 14, when the host device 150 is in the active mode, the software stack 350 is divided between the host device 150 and the secondary processor/wireless/wired MAC and PHY 262 as shown by dotted line 352-6. In this embodiment, the protocol stack 384 is executed by the secondary processor/wireless/wired MAC and PHY 262 in addition to the layers shown in FIG. 13. In FIGS. 9-14, a reduced software stack (as shown in FIG. 8B) is executed when the host processor 160 is in the inactive mode.

As can be appreciated by skilled artisans, when the secondary processor/wireless/wired MAC and PHY 262 executes the 802.11 protocol and AP MLME layer 376 when the host processor 16 is in the active mode and in the inactive mode, the switch between the active and inactive modes will be relatively transparent to clients in active access point implementations. When switching between active and inactive modes, the change in the source of the supply voltages to the active network system 180 can be detected. For example, when in the active mode, the regular power pins on the host interface supply power. In the inactive state, auxiliary pins on the host interface supply power. The change in power supply pins can be detected. Alternately, switching can be implemented using software.

In FIG. 7A, when the host processor 160 is in the active mode, the software-based network functions run on the host device. Access point, router, repeater, WAN-WLAN bridging, network address translation (NAT), and/or DHCP are supported by the host OS. Default GUI settings are loaded from the flash memory 270 and the GUI is provided by the host OS. New user settings are saved and transferred to flash memory 270. When the host processor 150 is in the inactive mode, the secondary processor/wireless/wired MAC and PHY 262, the host processor 160 or the host processor monitoring device 328 turns the switch 310 to the wired Ethernet connection provided by the active network device 180. Power is supplied using stand-by current from the host device, although other methods may be used to power the active network system 180. FW/GUI settings are downloaded from the flash memory 270 into the secondary processor/wireless/wired MAC and PHY 262. All access point, bridging, repeater, router, WAN-WLAN bridging, network address translation (NAT), and/or DHCP software is run by the secondary processor/wireless/wired MAC and PHY 262. Settings are changed using a Web-based interface in manner that is similar to methods for accessing separate access points, routers, repeaters and/or other network devices and saved into flash memory 270.

As can be appreciated, the active network system 180 will still function even when the host processor 150 is in the inactive mode. The active network system 180 has the ability to detect the active/inactive mode of the host processor 100 and to select the appropriate software stack. In addition to access point functionality, the active network system 180 can support other networking modes (repeater, bridging, router, point-to-point, point-to-multipoint, etc.) The active network system 180 also preserves the external Ethernet connection. In other words, the user does not have to unplug/replug the Ethernet cable when the host device transitions between the active and inactive modes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An active network system for a host device, the host device including a host processor configured to execute a first operating system, the active network system comprising:
    a wireless port including a first physical layer/medium access control (PHY/MAC) device;
    a first wired port including a second PHY/MAC device;
    and a secondary processor configured to communicate with the wireless port, the first wired port, and the host processor,
    wherein the secondary processor is configured to execute a second operating system that is different from the first operating system,
    wherein the secondary processor, the wireless port, and the first wired port are configured to support network functionality in response to the host processor switching from an active mode to an inactive mode,
    wherein a network function software stack is divided into (i) a first set of layers of the network function software stack and (i) a second set of layers of the network function software stack,
    wherein in response to the host processor being; in the active mode, (i) the host processor is configured to execute the first set of layers of the network function software stack and (ii) the secondary processor is configured to execute the second set of layers of the network function software stack,
    wherein in response to the host processor being in the inactive mode, a plurality of layers of at least one of the first set of layers and the second set of layers is disabled,
    wherein in response to (i) the host processor being; in the inactive mode, and (ii) the plurality of layers being disabled, the secondary processor is configured to execute the second set of layers without executing; the plurality of layers,
    wherein switching; between the active mode and the inactive mode is transparent to a client serviced by the active network system, and
    wherein the host device is configured to power the active network system during the inactive mode using a portion of standby current used to power the host device during the inactive mode.

2. The active network system of claim 1, wherein the inactive mode includes at least one of an off state, a hibernating state, and an on-but-non-responsive state; and wherein the active mode includes an on state in which the host processor is responsive.

3. The active network system of claim 1, wherein the network functionality includes access point functionality.

4. The active network system of claim 1, wherein the network functionality includes router functionality.

5. The active network system of claim 1, wherein the network functionality includes repeater functionality.

6. The active network system of claim 1, wherein the network functionality includes point-to-point functionality.

7. The active network system of claim 1, wherein the network functionality includes point-to-multipoint functionality.

8. The active network system of claim 1, further comprising a two-position switch configured to connect a first medium to the first wired port in response to the host processor being in the inactive mode.

9. The active network system of claim 8, wherein the secondary processor is configured to control the two-position switch.

10. The active network system of claim 8, wherein the host processor is configured to control the two-position switch.

11. The active network system of claim 8, further comprising a host processor monitoring device configured to:
monitor whether the host processor is in the active mode or in the inactive mode by (i) sending a message to the host processor, and (ii) determining whether the host processor is in the active mode or the inactive mode based on whether a response to the message is received within a predetermined period; and
control the two-position switch based on whether the host processor is in the active mode or in the active mode.

12. A host device comprising:
the active network system of claim 8, and
the host processor.

13. The host device of claim 12, further comprising:
a second wired port in communication with the host processor, wherein the second wired port includes a third PHY/MAC device,
wherein the two-position switch is configured to connect the first medium to the second wired port in response to the host processor being in the active mode.

14. The host device of claim 13, wherein the two-position switch is configured to connect the first medium to the first wired port in response to the host processor being in the inactive mode.

15. The host device of claim 13, wherein the second wired port is configured to support wired network functionality with the first medium in response to the host processor being in the active mode.

16. The host device of claim 1, wherein the secondary processor is configured to execute the first and second set of layers excluding host related layers in response to the host processor being is in the inactive mode.

17. The host device of claim 16, wherein the host related layers of the network function software stack include bus interface layers, a wireless LAN layer, and a host driver layer.

18. The active network system of claim 1, further comprising memory configured to communicate with the secondary processor.

19. The active network system of claim 18, wherein response to the host processor being in the inactive mode:
the secondary processor, the wireless port, and the first wired port are configured to support web-based access to network settings, wherein the network settings are stored in the memory.

20. The active network system of claim 1, further comprising a host input/output (I/O) interface configured to communicate with the secondary processor.

21. The active network system of claim 20, wherein the host I/O interface includes one of a peripheral component interconnect (PCI) bus, a universal serial bus (USB), an IEEE 1394 bus, PCI Express bus, a media independent interface (MII), a PCMCIA bus, a serial ATA interface, a memory stick interface, a secure digital input/output (SDIO) interface, and a mini PCI bus.

22. The active network system of claim 1, wherein the secondary processor, the first PHY/MAC device, and the second PHY/MAC device are implemented by an integrated circuit.

23. The active network system of claim 1, wherein the second PHY/MAC device supports at least one of 10BaseT, 100BaseT, and 1000BaseT.

24. The active network system of claim 1, wherein the first PHY/MAC device is configured to support a wireless network.

25. The active network system of claim 24, wherein the wireless network is compliant with at least one of IEEE section 802.11, 802.11a, 802.11b, 802.11g, 802.11n, and 802.16.

26. A wireless video distribution system comprising:
the active network system of claim 1;
a remote device; and
a set top box in communication with the host device, wherein the set top box is configured to receive content from a content provider,
wherein the host processor and the wireless port are configured to wirelessly distribute the content to the remote device in response to the host processor being in the active mode.

27. The wireless video distribution system of claim 26, wherein the secondary processor, the wireless port, and the first wired port are configured to support the network functionality in response to the host processor is switching from the active mode to the inactive mode.

28. The host device of claim 1, wherein the first set of layers of the network function software stack are different from the second set of layers of the network function software stack.

29. The host device of claim 1, wherein the host processor is different from the secondary processor.

30. The host device of claim 1, further comprising a bus, wherein the host processor and the secondary processor are configured to communicate with the wireless port and the first wired port through the bus.

31. The host device of claim 30, further comprising a host input/output interface, wherein the host processor is configured to communicate remotely with the bus via the host input/output interface.

32. The host device of claim 1, wherein the host processor is configured to control host operations of the host device, and wherein the secondary processor is included in a network system for the host device and is configured to control networking operations of the network system and is excluded from control of host operations of the host device.

33. An active repeater system for a host device, the host device including a host processor that configured to execute a first operating system, the active repeater system comprising:
a wireless port including a first physical layer/medium access control (PHY/MAC) device; and
a secondary processor configured to selectively communicate with the wireless port and the host processor,
wherein the secondary processor is configured to execute a second operating system that is different from the first operating system,
Wherein the secondary processor and the wireless port are configured to support repeater functionality in response to the host processor switching from an active mode to an inactive mode, wherein a network function software stack is divided into (i) a first set of layers of the network function software stack and (i) a second set of layers of the network function software stack, wherein in response to the host processor being in the active mode, (i) the host processor is configured to execute the first set of layers of the network function software stack and (ii) the secondary processor is configured to execute the second set of layers of the network function software stack, wherein in response to the host processor being in the inactive mode, a plurality of layers of at least one of the first set of layers and the second set of layers is disabled, wherein in response to (i) the host processor being in the inactive mode, and (ii) the plurality of layers being disabled, the secondary processor is configured to execute the second set of layers without executing the plurality of layers, wherein switching between the active mode and the inactive mode is transparent to a client serviced by the active repeater system, and wherein the host device is configured to power the active repeater system during the inactive mode using a portion of standby current used to power the host device during the inactive mode.

34. The active repeater system of claim 33, wherein the inactive mode includes at least one of an off state, a hibernating state, and an on-but-non-responsive state; and wherein the active mode includes an on state in response to the host processor being responsive.

35. A host device comprising:
the active repeater system of claim 33; and
the host processor.

36. The host device of claim 35, further comprising memory configured to communicate with the secondary processor.

37. The host device of claim 36, wherein in response to the host processor switching from the active mode to the inactive mode, the secondary processor and the wireless port are configured to support web-based access to repeater network settings, wherein the repeater network settings are stored in the memory.

38. The active repeater system of claim 33, further comprising a host input/output (I/O) interface configured to communicate with the secondary processor.

39. The active repeater system of claim 38, wherein the host I/O interface includes one of a peripheral component interconnect (PCI) bus, a universal serial bus (USB), an IEEE 1394 bus, PCI Express bus, a PCMCIA bus, a media independent interface (MII), a serial ATA interface, a memory stick interface, a secure digital input/output (SDIO) interface, and a mini PCI bus.

40. The active repeater system of claim 33, wherein the secondary processor and the first PHY/MAC device are implemented by an integrated circuit.

41. The active repeater system of claim 33, wherein the first PHY/MAC device is configured to support a wireless network.

42. The active repeater system of claim 41, wherein the wireless network is compliant with at least one of IEEE section 802.11, 802.11a, 802.11b, 802.11g, 802.11n, and 802.16.

43. The host device of claim 33, wherein the plurality of layers of the software stack include a bus interface layer, a wireless LAN layer, and a host driver layer.

44. The active repeater system of claim 33, further comprising a host processor monitoring device configured to monitor whether the host processor is in the active mode or in the inactive mode by (i) sending a message to the host processor, and (ii) determining whether the host processor is in the active mode or the inactive mode based on whether a response to the message is received within a predetermined period.

45. A method for providing an active network system configured to support network functionality, the method comprising:

dividing a network function software stack into (i) a first set of layers of the network function software stack and (i) a second set of layers of the network function software stack;

executing the first set of layers of the network function software stack using a host processor of a host device in response to the host processor being in an active mode, wherein the host processor executes is configured to execute a first operating system; executing the second set of layers of the network function software stack using a secondary processor of an active network device in response to the host processor being in the active mode, wherein the secondary processor is configured to execute a second operating systems that is different from the first operating system;

disabling, in response to the host processor being switching from the active mode to an inactive mode, a plurality of layers of at least one of the first set of layers and the second set of layers; and executing the first set of layers and the second set of layers of the network function software stack excluding the plurality of layers using the secondary processor in response to the host processor switching from the active mode to the inactive mode, wherein the switching between the active mode and the inactive mode is transparent to a client serviced by the active network system, and wherein the host device is configured to power the active network system during the inactive mode using a portion of standby current used to power the host device during the inactive mode.

46. The method of claim 45, wherein the plurality of layers of the network function software stack include bus interface layers, a wireless LAN layer, and a host driver layer.

47. The method of claim 45, wherein the first set of layers of the network function software stack includes an application and graphical user interface layer, a protocol stack layer, an application protocol interface layer, a wireless network protocol layer, and a first bus interface layer.

48. The method of claim 45, wherein the second set of layers of the network function software stack includes a second bus interface layer, a wireless LAN layer, a wireless MAC driver layer, and a hardware abstraction layer.

49. The method of claim 45, wherein the inactive mode includes at least one of an off state, a hibernating state, and an on-but-non-responsive state; and wherein the active mode includes an on state in which the host processor is responsive.

50. The method of claim 45, wherein the network functionality includes access point functionality.

51. The method of claim 45, wherein the network functionality includes router functionality.

52. The method of claim 45, wherein the network functionality includes repeater functionality.

53. The method of claim 45, wherein the network functionality includes point-to-point functionality.

54. The method of claim 45, wherein the network functionality includes point-to-multipoint functionality.

55. The method of claim 45, wherein the first set of layers of the network function software stack includes an application and graphical user interface layer, a protocol stack layer, a host driver layer, an application protocol interface layer, and a wireless network protocol layer.

56. The method of claim 45, wherein the second set of layers of the network function software stack includes a first bus interface layer, a second bus interface layer, a wireless LAN layer, a wireless MAC driver layer, and a hardware abstraction layer.

57. The method of claim 45, wherein the first set of layers of the network function software stack includes an application and graphical user interface layer, a protocol stack layer, a host driver layer and an application protocol interface layer.

58. The method of claim 45, wherein the second set of layers of the network function software stack includes a wireless network protocol layer, a first bus interface layer, a second bus interface layer, a wireless LAN layer, a wireless MAC driver layer, and a hardware abstraction layer.

59. The method of claim 45, wherein the first set of layers of the network function software stack includes an application and graphical user interface layer, a protocol stack layer, and a host driver layer.

60. The method of claim 45, wherein the second set of layers of the network function software stack includes an application protocol interface layer, a wireless network protocol layer, a first bus interface layer, a second bus interface layer, a wireless LAN layer, a wireless MAC driver layer, and a hardware abstraction layer.

61. The method of claim 45, wherein the first set of layers of the network function software stack includes an application and graphical user interface layer and a protocol stack layer.

62. The method of claim 45, wherein the second set of layers of the network function software stack includes a host driver layer, an application protocol interface layer, a wireless network protocol layer, a first bus interface layer, a second bus interface layer, a wireless LAN layer, a wireless MAC driver layer, and a hardware abstraction layer.

63. The method of claim 45, wherein the first set of layers of the network function software stack includes an application and graphical user interface layer.

64. The method of claim 45, wherein the second set of layers of the network function software stack includes a protocol stack layer, a host driver layer, an application protocol interface layer, a wireless network protocol layer, a first bus interface layer, a second bus interface layer, a wireless LAN layer, a wireless MAC driver layer, and a hardware abstraction layer.

65. The method of claim 45, further comprising monitoring whether the host processor is in the active mode or in the inactive mode by (i) sending a message to the host processor, and (ii) determining whether the host processor is in the active mode or the inactive mode based on whether a response to the message is received within a predetermined period.

66. A method for providing an active network system for a host device, the host device including with a host processor configured to execute a first operating system, the method comprising:
providing a wireless port and a first wired port;
using a secondary processor to support network functionality in response to the host processor switching from an active mode to an inactive mode, wherein the secondary processor is configured to execute a second operating system that is different from the first operating system, and wherein the secondary processor is in communication with the wireless port, the first wired port, and the host processor,
dividing a network function software stack into (i) a first set of layers of the network function software stack and (i) a second set of layers of the network function software stack;
in response to the host processor being in the active mode, using (i) the host processor to execute the first set of layers of the network function software stack and (ii) the secondary processor to execute the second set of layers of the network function software stack;
disabling, in response to the host processor being in the inactive mode, a plurality of layers of at least one of the first set of layers and the second set of layers; and
using the secondary processor, in response to (i) the host processor being in the inactive mode, and (ii) the plurality of layers being disabled, to execute the second set of layers without executing the plurality of layers,
wherein switching between the active mode and the inactive mode is transparent to a client serviced by the active network system, and
powering the active network system during the inactive mode using a portion of standby current used to power the host device during the inactive mode.

67. The method of claim 66, wherein the inactive mode includes at least one of an off state, a hibernating state, and an on-but-non-responsive state; and wherein the active mode includes an on state in which the host processor is responsive.

68. The method of claim 66, wherein the network functionality includes access point functionality.

69. The method of claim 66, wherein the network functionality includes router functionality.

70. The method of claim 66, wherein the network functionality includes repeater functionality.

71. The method of claim 66, wherein the network functionality includes point-to-point functionality.

72. The method of claim 66, wherein the network functionality includes point-to-multipoint functionality.

73. The method of claim 66, further comprising selectively connecting a first medium to the first wired port when the host processor is in the inactive mode.

74. The method of claim 66, further comprising monitoring an active/inactive mode of the host processor.

75. The method of claim 66, further comprising:
providing a second wired port configured to communicate with the host processor; and
selectively connecting a first medium to the second wired port in response to the host processor being in the active mode.

76. The method of claim 75, further comprising selectively connecting the first medium to the first wired port in response to the host processor being in the inactive mode.

77. The method of claim 75, further comprising supporting wired network functionality with the first medium using the second wired port in response to the host processor being in the active mode.

78. The method of claim 77, further comprising supporting web-based access to network settings in response to the host processor being in the inactive mode.

79. The method of claim 66, wherein the first wired port is configured to support at least one of 10BaseT, 100BaseT and 1000BaseT.

80. The method of claim 66, wherein the wireless port is configured to support a wireless network.

81. The method of claim 80, wherein the wireless network is compliant with at least one of IEEE 802.11, 802.11a, 802.11b, 802.11g, 802.11n, and 802.16.

82. The method of claim 66, wherein the plurality of layers of the software stack include bus interface layers, a wireless LAN layer, and a host driver layer.

83. The method of claim 66, further comprising monitoring whether the host processor is in the active mode or in the inactive mode by (i) sending a message to the host processor, and (ii) determining whether the host processor is in the active mode or the inactive mode based on whether a response to the message is received within a predetermined period.

84. A method for providing an active repeater system for a host device, the host device including a host processor that configured to execute a first operating system, the method comprising:
   providing a wireless port;
   providing a secondary processor configured to
      selectively communicate with the wireless port and the host processor, and
      support repeater functionality in response to the host processor switching from an active mode to an inactive mode,
   wherein the secondary processor executes a second operating system that is different from the first operating system;
   dividing a network function software stack into (i) a first set of layers of the network function software stack and (i) a second set of layers of the network function software stack,
   in response to the host processor being in the active mode, using (i) the host processor to execute the first set of layers of the network function software stack and (ii) the secondary processor to execute the second set of layers of the network function software stack;
   disabling, in response to the host processor being in the inactive mode, a plurality of layers of at least one of the first set of layers and the second set of layers; and
   using the secondary processor, in response to (i) the host processor being in the inactive mode, and (ii) the plurality of layers being disabled, to execute the second set of layers without executing the plurality of layers,
   wherein switching between the active mode and the inactive mode is transparent to a client serviced by the active repeater system, and
   powering the active repeater system during the inactive mode using a portion of standby current used to power the host device during the inactive mode.

85. The method of claim 84, wherein the inactive mode includes at least one of an off state, a hibernating state, and an on-but-non-responsive state; and wherein the active mode includes an on state in which the host processor is responsive.

86. The method of claim 84, further comprising supporting web-based access to network settings in response to the host processor being in the inactive mode.

87. The method of claim 84, wherein the wireless port supports is configured to support a wireless network.

88. The method of claim 87, wherein the wireless network is compliant with at least one of IEEE section 802.11, 802.11a, 802.11b, 802.11g, 802.11n, and 802.16.

89. The method of claim 84, wherein the plurality of layers of the network function software stack include bus interface layers, a wireless LAN layer, and a host driver layer.

90. The method of claim 84, further comprising monitoring whether the host processor is in the active mode or in the inactive mode by (i) sending a message to the host processor, and (ii) determining whether the host processor is in the active mode or the inactive mode based on whether a response to the message is received within a predetermined period.

91. An active network system configured to support network functionality, the active network system comprising:
   a host device including a host processor configured to execute a first set of layers of a network function software stack in response to the host processor being in an active mode, wherein the host processor executes is configured to execute a first operating system, and wherein the network function software stack is divided into (i) the first set of layers of the network function software stack and (i) a second set of layers of the network function software stack; and
   a secondary processor that configured to communicate with the host processor and to execute the second set of layers of the network function software stack in response to the host processor being the active mode,
   wherein in response to the host processor switching from the active mode to an inactive mode, a plurality of layers of at least one of the first set of layers and the second set of layers is disabled,
   wherein the secondary processor is configured to execute the first set of layers and the second set of layers of the network function software stack excluding the plurality of layers in response to the host processor switching from the active mode to the inactive mode,
   wherein the secondary processor is configured to a second operating system that is different from the first operating system,
   wherein switching between the active mode and the inactive mode is transparent to a client serviced by the active network system, and
   wherein the host device is configured to power the active network system during the inactive mode using a portion of standby current used to power the host device during the inactive mode.

92. The active network system of claim 91, wherein the plurality of layers of the network function software stack include a bus interface layer, a wireless LAN layer, and a host driver layer.

93. The active network system of claim 91, wherein the first set of layers of the network function software stack includes an application and graphical user interface layer, a protocol stack layer, an application protocol interface layer, a wireless network protocol layer, and a first bus interface layer.

94. The active network system of claim 91, wherein the second set of layers of the network function software stack includes a second bus interface layer, a wireless LAN layer, a wireless MAC driver layer, and a hardware abstraction layer.

95. The active network system of claim 91, wherein the inactive mode includes at least one of an off state, a hibernating state, and an on-but-non-responsive state; and wherein the active mode includes an on state in which the host processor is responsive.

96. The active network system of claim 91, wherein the network functionality includes access point functionality.

97. The active network system of claim 91, wherein the network functionality includes router functionality.

98. The active network system of claim 91, wherein the network functionality includes repeater functionality.

99. The active network system of claim 91, wherein the network functionality includes point-to-point functionality.

100. The active network system of claim 91, wherein the network functionality includes point-to-multipoint functionality.

101. The active network system of claim 91, wherein the first set of layers of the network function software stack includes an application and graphical user interface layer, a protocol stack layer, an application protocol interface layer, and a wireless network protocol layer.

102. The active network system of claim 91, wherein the second set of layers of the network function software stack includes a first bus interface layer, a second bus interface layer, a wireless LAN layer, a wireless MAC driver layer, and a hardware abstraction layer.

103. The active network system of claim 91, wherein the first set of layers of the network function software stack includes an application and graphical user interface layer, a protocol stack layer, and an application protocol interface layer.

104. The active network system of claim 91, wherein the second set of layers of the network function software stack includes a wireless network protocol layer, a first bus interface layer, a second bus interface layer, a wireless LAN layer, a wireless MAC driver layer, and a hardware abstraction layer.

105. The active network system of claim 91, wherein the first set of layers of the network function software stack includes an application and graphical user interface layer and a protocol stack layer.

106. The active network system of claim 91, wherein the second set of layers of the network function software stack includes an application protocol interface layer, a wireless network protocol layer, a first bus interface layer, a second bus interface layer, a wireless LAN layer, a wireless MAC driver layer, and a hardware abstraction layer.

107. The active network system of claim 91, wherein the first set of layers of the network function software stack includes an application and graphical user interface layer.

108. The active network system of claim 91, wherein the second set of layers of the network function software stack includes a protocol stack layer, an application protocol interface layer, a wireless network protocol layer, a first bus interface layer, a second bus interface layer, a wireless LAN layer, a wireless MAC driver layer, and a hardware abstraction layer.

109. The active network system of claim 91, wherein the first set of layers of the network function software stack includes an application and graphical user interface layer.

110. The active network system of claim 91, wherein the second set of layers of the network function software stack includes a protocol stack layer, a host driver layer, an application protocol interface layer, a wireless network protocol layer, a first bus interface layer, a second bus interface layer, a wireless LAN layer, a wireless MAC driver layer, and a hardware abstraction layer.

111. The active network system of claim 91, further comprising a host processor monitoring device configured to monitor whether the host processor is in the active mode or in the inactive mode by (i) sending a message to the host processor, and (ii) determining whether the host processor is in the active mode or the inactive mode based on whether a response to the message is received within a predetermined period.

112. A method for providing an active network system, the method comprising:
dividing a network function software stack into (i) a first set of layers of the network function software stack and (i) a second set of layers of the network function software stack;
monitoring an operating mode of a host processor configured to execute a first operating system, wherein the operating mode includes an active mode and an inactive mode;
operating a secondary processor, which communicates with the host processor, during the inactive mode wherein the secondary processor is configured to execute a second operating system that is different from the first operating system;
executing a network function using at least one of the host processor and the secondary processor in response to the host processor being in the active mode, wherein the network function includes at least one of access point, router, repeater, point-to-point, and point-to-multipoint network functionality;
executing the network function using the secondary processor in response to the host processor switching from the active mode to the inactive mode,
executing, in response to the host processor being in the active mode, (i) the first set of layers of the network function software stack using the host processor and (ii) the second set of layers of the network function software stack using the secondary processor;
disabling, in response to the host processor being in the inactive mode, a plurality of layers of at least one of the first set of layers and the second set of layers; and
using the secondary processor, in response to (i) the host processor being in the inactive mode, and (ii) the plurality of layers being disabled, to execute the second set of layers without executing the plurality of layers,
wherein switching between the active mode and the inactive mode is transparent to a client serviced by the active network system, and
powering the active network system during the inactive mode using a portion of standby current used to power a host device comprising the host processor during the inactive mode.

113. The method of claim 112, wherein the plurality of layers of the network function software stack include bus interface layers, a wireless LAN layer, and a host driver layer.

114. The method of claim 112, wherein the inactive mode includes at least one of an off state, a hibernating state, and an on-but-non-responsive state; and wherein the active mode includes an on state in which the host processor is responsive.

115. The method of claim 112, wherein the network function remains operational while the host processor transitions from the active mode to the inactive mode.

116. The method of claim 112, wherein the monitoring the operating mode of the host processor comprises monitoring whether the host processor is in the active mode or in the inactive mode by (i) sending a message to the host processor, and (ii) determining whether the host processor is in the active mode or the inactive mode based on whether a response to the message is received within a predetermined period.

117. A method for providing an active network system, the method comprising:
dividing; a network function software stack into (i) a first set of layers of the network function software stack and (i) a second set of layers of the network function software stack;
monitoring an operating mode of a host processor configured to execute a first operating system, wherein the operating mode includes an active mode and an inactive mode;
operating a secondary processor, which communicates with the host processor, during the inactive mode, wherein the secondary processor is configured to execute a second operating system that is different from the first operating system;

providing at least one of a wired port and a wireless port using at least one of the host processor and the secondary processor in response to the host processor is being in the active mode;

providing the at least one of the wireless port and the wired port using the secondary processor in response to the host processor switching; from the active mode to the inactive mode, executing, in response to the host processor being; in the active mode, (i) the first set of layers of the network function software stack using; the host processor and (ii) the second set of layers of the network function software stack using; the secondary processor;

disabling, in response to the host processor being; in the inactive mode, a plurality of layers of at least one of the first set of layers and the second set of layers; and using the secondary processor, in response to (i) the host processor being in the inactive mode, and (ii) the plurality of layers being disabled, to execute the second set of layers without executing the plurality of layers, wherein switching between the active mode and the inactive mode is transparent to a client serviced by the active network system, and powering the active network system during the inactive mode using a portion of standby current used to power a host device comprising the active network system during the inactive mode.

118. The method of claim 117, wherein the at least one of the wireless port and the wired port remains operational while the host processor transitions from the active mode to the inactive mode.

119. The method of claim 117, wherein the plurality of layers of the network function software stack include bus interface layers, a wireless LAN layer, and a host driver layer.

120. The method of claim 117, wherein the inactive mode includes at least one of an off state, a hibernating state, and an on-but-non-responsive state; and wherein the active mode includes an on state in which the host processor is responsive.

121. The method of claim 117, wherein the monitoring the operating mode of the host processor comprises monitoring whether the host processor is in the active mode or in the inactive mode by (i) sending a message to the host processor, and (ii) determining whether the host processor is in the active mode or the inactive mode based on whether a response to the message is received within a predetermined period.

122. An active network system, comprising:
a host device including a host processor configured to execute a first operating system;
a secondary processor configured to communicate with the host processor and to execute a second operating system that is different from the first operating system; and
a mode monitor configured to communicate with the host processor and the secondary processor and to determine an operating mode of the host processor, wherein the operating mode includes an active mode and an inactive mode,
wherein at least one of the host processor and the secondary processor is configured to support a network function in response to the host processor being in the active mode,
wherein the network function includes at least one of access point, router, repeater, point-to-point, and point-to-multipoint network functionality,
wherein the secondary processor supports the network function in response to the host processor switching from the active mode to the inactive mode,
wherein a network function software stack is divided into (i) a first set of layers of the network function software stack and (i) a second set of layers of the network function software stack,
wherein in response to the host processor being in the active mode, (i) the host processor is configured to execute the first set of layers of the network function software stack and (ii) the secondary processor is configured to execute the second set of layers of the network function software stack,
wherein in response to the host processor being in the inactive mode, a plurality of layers of at least one of the first set of layers and the second set of layers is disabled,
wherein in response to (i) the host processor being in the inactive mode, and (ii) the plurality of layers being disabled, the secondary processor is configured to execute the second set of layers without executing the plurality of layers,
wherein switching between the active mode and the inactive mode is transparent to a client serviced by the active network system, and
wherein the host device is configured to power the active network system during the inactive mode using a portion of standby current used to power the host device during the inactive mode.

123. The active network system of claim 122, wherein the plurality of layers of the network function software stack include bus interface layers, a wireless LAN layer, and a host driver layer.

124. The active network system of claim 122, wherein the inactive mode includes at least one of an off state, a hibernating state, and an on-but-non-responsive state; and wherein the active mode includes an on state in which the host processor is responsive.

125. The active network system of claim 122, wherein the network function remains operational while the host processor transitions from the active mode to the inactive mode.

126. The active network system of claim 122, wherein the mode monitor is configured to monitor whether the host processor is in the active mode or in the inactive mode by (i) sending a message to the host processor, and (ii) determining whether the host processor is in the active mode or the inactive mode based on whether a response to the message is received within a predetermined period.

127. An active network system, comprising:
a host device including a host processor configured to execute a first operating system;
a secondary processor configured to communicate with the host processor and to execute a second operating system that is different from the first operating system; and
a mode monitor configured to communicate with the host processor and the secondary processor to determine an operating mode of the host processor, wherein the operating mode includes an active mode and an inactive mode,
wherein at least one of the host processor and the secondary processor supports is configured to support at least one of a wired port and a wireless port in response to the host processor being in the active mode;
wherein the secondary processor is configured to support at least one of the wireless port, the wired port in response to the host processor switching from the active mode to said inactive mode,
wherein a network function software stack is divided into (i) a first set of layers of the network function software stack and (i) a second set of layers of the network function software stack, wherein in response to the host processor being in the active mode, (i) the host processor is configured to execute the first set of layers of the network function software stack and (ii) the secondary processor is configured to execute the second set of layers of the network function software stack, wherein in response to the host processor being in the inactive mode, a plurality of layers of at least one of the first set of layers and the second set of layers is disabled, wherein in response to (i) the host processor being in the inactive mode, and (ii) the plurality of layers being disabled, the secondary processor is configured to execute the second set of layers without executing the plurality of layers, wherein switching between the active mode and the inactive mode is transparent to a client serviced by the active network system, and wherein the host device is configured to power the active network system during the inactive mode using a portion of standby current used to power the host device during the inactive mode.

128. The active network system of claim 127, wherein the at least one of the wireless port and the wired port remains operational while the host processor transitions from the active mode to the inactive mode.

129. The active network system of claim 127, wherein the plurality of layers of the network function software stack include bus interface layers, a wireless LAN layer, and a host driver layer.

130. The active network system of claim 127, wherein the inactive mode includes at least one of an off state, a hibernating state, and an on-but-non-responsive state; and wherein the active mode includes an on state in which the host processor is responsive.

131. The active network system of claim 127, wherein the mode monitor is configured to monitor whether the host processor is in the active mode or in the inactive mode by (i) sending a message to the host processor, and (ii) determining whether the host processor is in the active mode or the inactive mode based on whether a response to the message is received within a predetermined period.

* * * * *